(12) United States Patent
Yaeger

(10) Patent No.: US 12,111,631 B1
(45) Date of Patent: Oct. 8, 2024

(54) SYSTEMS AND METHODS FOR COMPUTER AIDED MANUFACTURING USING AN INTEGRATED SCANNER

(71) Applicant: Product Development Factory, Inc., Telford, PA (US)

(72) Inventor: David E. Yaeger, Telford, PA (US)

(73) Assignee: Product Development Factory, Inc., Telford, PA (US)

( * ) Notice: Subject to any disclaimer, the term of this patent is extended or adjusted under 35 U.S.C. 154(b) by 0 days.

(21) Appl. No.: 18/499,674

(22) Filed: Nov. 1, 2023

Related U.S. Application Data

(60) Provisional application No. 63/581,359, filed on Sep. 8, 2023, provisional application No. 63/496,973, filed on Apr. 19, 2023.

(51) Int. Cl.
*G05B 19/4099* (2006.01)
*B29C 64/393* (2017.01)
*B33Y 10/00* (2015.01)
*B33Y 50/02* (2015.01)

(52) U.S. Cl.
CPC ........ *G05B 19/4099* (2013.01); *B29C 64/393* (2017.08); *B33Y 10/00* (2014.12); *B33Y 50/02* (2014.12); *G05B 2219/35012* (2013.01); *G05B 2219/37558* (2013.01)

(58) Field of Classification Search
CPC ....... B29C 64/393; B33Y 50/02; B33Y 10/00; G05B 19/4099
USPC .......................................................... 700/98
See application file for complete search history.

(56) References Cited

U.S. PATENT DOCUMENTS

| | | | |
|---|---|---|---|
| 2017/0129180 A1* | 5/2017 | Coates | B23Q 11/0891 |
| 2022/0155749 A1* | 5/2022 | Garvey | G05B 19/401 |
| 2024/0085350 A1* | 3/2024 | Tracy | G05B 19/4093 |

FOREIGN PATENT DOCUMENTS

WO   WO-2023286639 A1 *  1/2023

* cited by examiner

*Primary Examiner* — Mohammad Ali
*Assistant Examiner* — Joshua T Sanders
(74) *Attorney, Agent, or Firm* — Morgan, Lewis & Bockius LLP

(57) ABSTRACT

Systems and methods of computer aided manufacturing are disclosed. A computer aided manufacturing device includes a tool operable to perform a manufacturing operation within a working area. A scanner obtains scan data corresponding to a portion of the working area. A processor is configured to obtain scan data of a workpiece positioned within the working area, generate a digital model of the workpiece, generate a tool path for the tool based on the digital model, operate the computer aided manufacturing system to perform the at least one manufacturing operation according to the at least one tool path to generate a modified workpiece, obtain scan data of the modified workpiece, and verify the at least one manufacturing operation based on the scan data of the modified workpiece.

20 Claims, 19 Drawing Sheets

Notes:
1. Typcially used to copy objects/landscapes using scanner technology opposed to having CAD
2. Saved programs will help prompt similar future builds.

SYSTEMS AND METHODS FOR COMPUTER AIDED MANUFACTURING USING AN INTEGRATED SCANNER

CROSS-REFERENCE TO RELATED APPLICATION

This application claims benefit under 35 U.S.C. § 119 to U.S. Provisional Application Ser. No. 63/496,973, filed 19 Apr. 2023, entitled "Systems and Methods for Computer Aided Manufacturing using an Integrated Scanner" and U.S. Provisional Application Ser. No. 63/581,358, filed 8 Sep. 2023, entitled "Systems and Methods for Computer Aided Manufacturing using an Integrated Scanner," the disclosure of each of which is incorporated herein by reference in its respective entirety.

TECHNICAL FIELD

This application relates generally to computer aided manufacturing (CAM), and more particularly, to the use of target material scan data for CAM.

BACKGROUND

Computer aided manufacturing (CAM) utilizes computer controlled machinery to automate manufacturing processes. Current systems generate computer numerical control (CNC) input to generate toolpaths for operation of computer controlled machinery. Current software packages rely on idealized models generated from expected dimensions of materials to generate toolpaths and utilize post-processing to convert toolpaths to inputs for the computer controlled machinery.

Current systems rely on computer aided design (CAD) programs to generate designs (e.g., form and function definitions) for a product, part, or system and utilize separate CAM programs for operation of computer controller machinery to generate a part or product designed in the CAD program. In some current systems, a theoretical envelope is created around a CAD model representative of a starting physical material for generation of the part.

After generation of the CAD model, CAM software can prepare a model for machining. Current CAM software utilizes a process including geometric error checks, toolpath generation, determination of machine parameters, and orientation determination. Current CAM software converts a toolpath to a predetermined control code, such as G-code, for control of the computer controlled machinery. The converted toolpath is provided to the computer controlled machinery which generates at least a portion of the part or product based on the received code. Although current systems are capable of manufacturing parts, they require the actual materials used to precisely match the theoretical envelopes and cannot respond to unexpected material changes during manufacture.

SUMMARY

In various embodiments, a system is disclosed. The system includes a computer aided manufacturing device comprising at least one tool operable to perform at least one manufacturing operation within a working area, a scanner configured to obtain scan data corresponding to at least a portion of the working area, and a processor. The processor is configured to operate the scanner to obtain scan data of a workpiece positioned within the working area, generate a digital model of the workpiece based on the scan data of the workpiece, generate at least one tool path for the at least one tool to perform the at least one manufacturing operation within the working area based on the digital model, operate the computer aided manufacturing system to perform the at least one manufacturing operation according to the at least one tool path to generate a modified workpiece, operate the scanner to obtain scan data of the modified workpiece, and verify the at least one manufacturing operation based on the scan data of the modified workpiece.

In various embodiments, a method of operating a computer aided manufacturing device is disclosed. The method includes steps of obtaining, by a scanner integrated with the computer aided manufacturing device, scan data of a workpiece positioned within a working area of the computer aided manufacturing device via a scanner; generating, by a scanner integrated with the computer aided manufacturing device, a digital model of the workpiece; and generating, by a processor, at least one tool path for at least one tool of the computer aided manufacturing device. The at least one tool path is generated based, at least in part, on the digital model. The method further includes steps of operating, by the processor, the computer aided manufacturing system to perform the at least one manufacturing operation according to the at least one tool path to generate a modified workpiece; generating, by the scanner, scan data of the modified workpiece; and verifying, by the processor, the at least one manufacturing operation based on the scan data of the modified workpiece.

In various embodiments, a system is disclosed. The system includes a computer aided manufacturing device and a processor. The computer aided manufacturing device includes at least one tool operable to perform at least one manufacturing operation within a working area defined by the computer aided manufacturing device and an integrated scanner comprising a field of view including at least a portion of the working area. The processor is configured to obtain scan data of a workpiece positioned within the working area, wherein the scan data is obtained from the integrated scanner, generate a digital model of the workpiece based on the scan data of the workpiece, generate at least one tool path configured to operate the computer aided manufacturing device to perform the at least one manufacturing operation within the working area based on the digital model, transmit instructions to the computer aided manufacturing system configured to cause the computer aided manufacturing system to perform the at least one manufacturing operation according to the at least one tool path to generate a modified workpiece, operate the scanner to obtain scan data of the modified workpiece, and verify the at least one manufacturing operation based on the scan data of the modified workpiece.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1A:
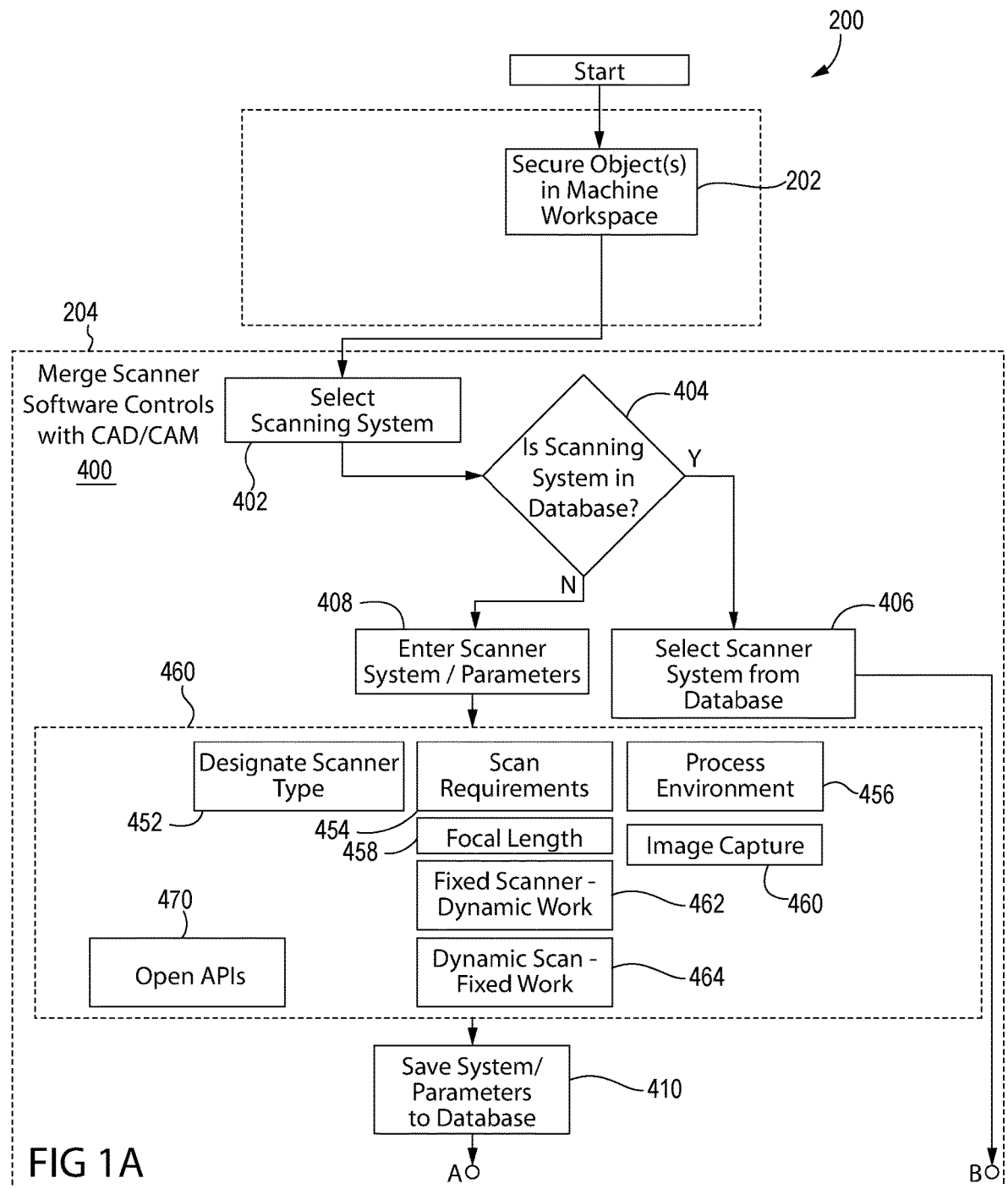
FIGS. 1A-1G are a flowchart illustrating a method of integrated generation of CAD bounding boxes and CAM toolpaths, in accordance with some embodiments.
Figure 1B:
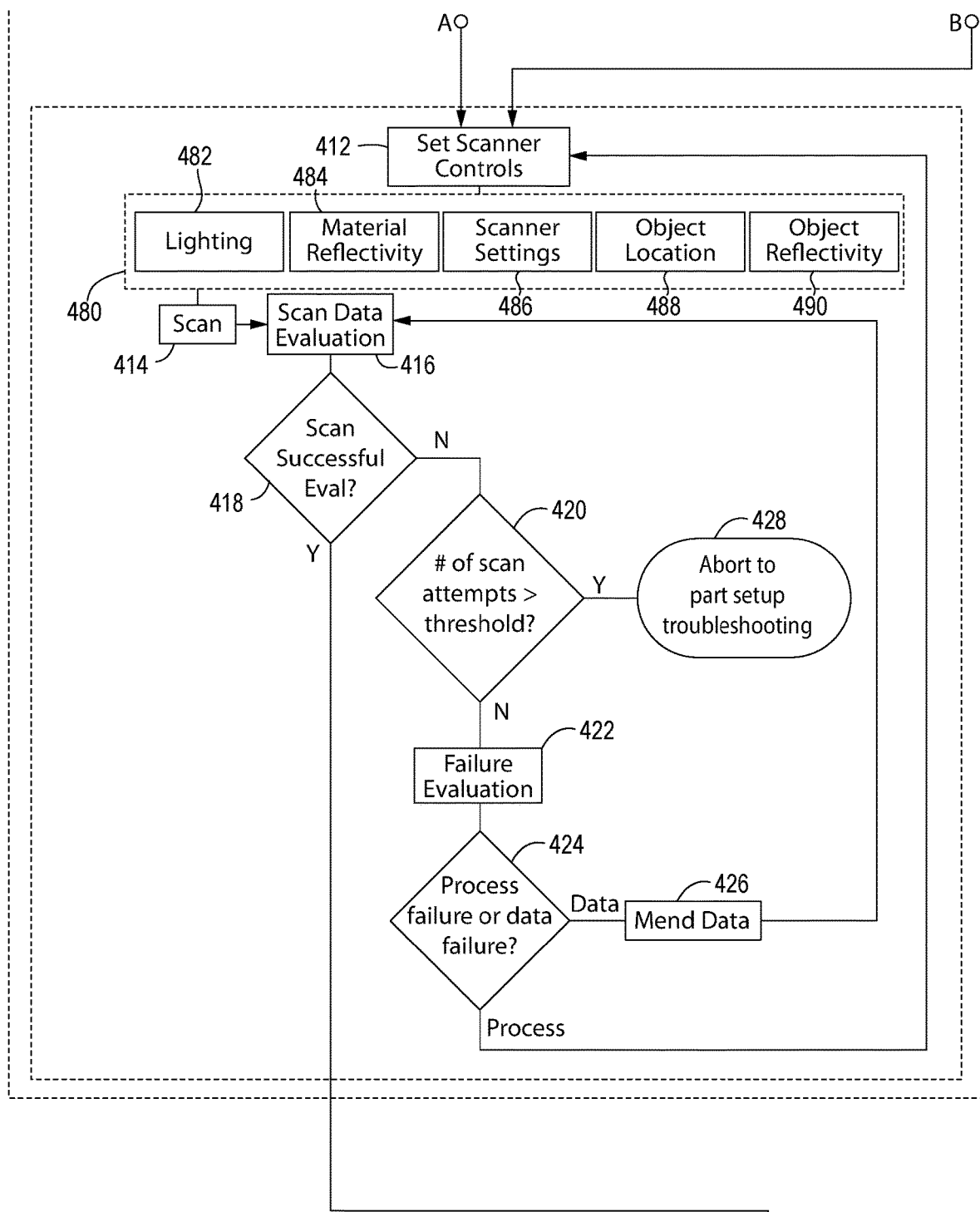
Figure 1C:
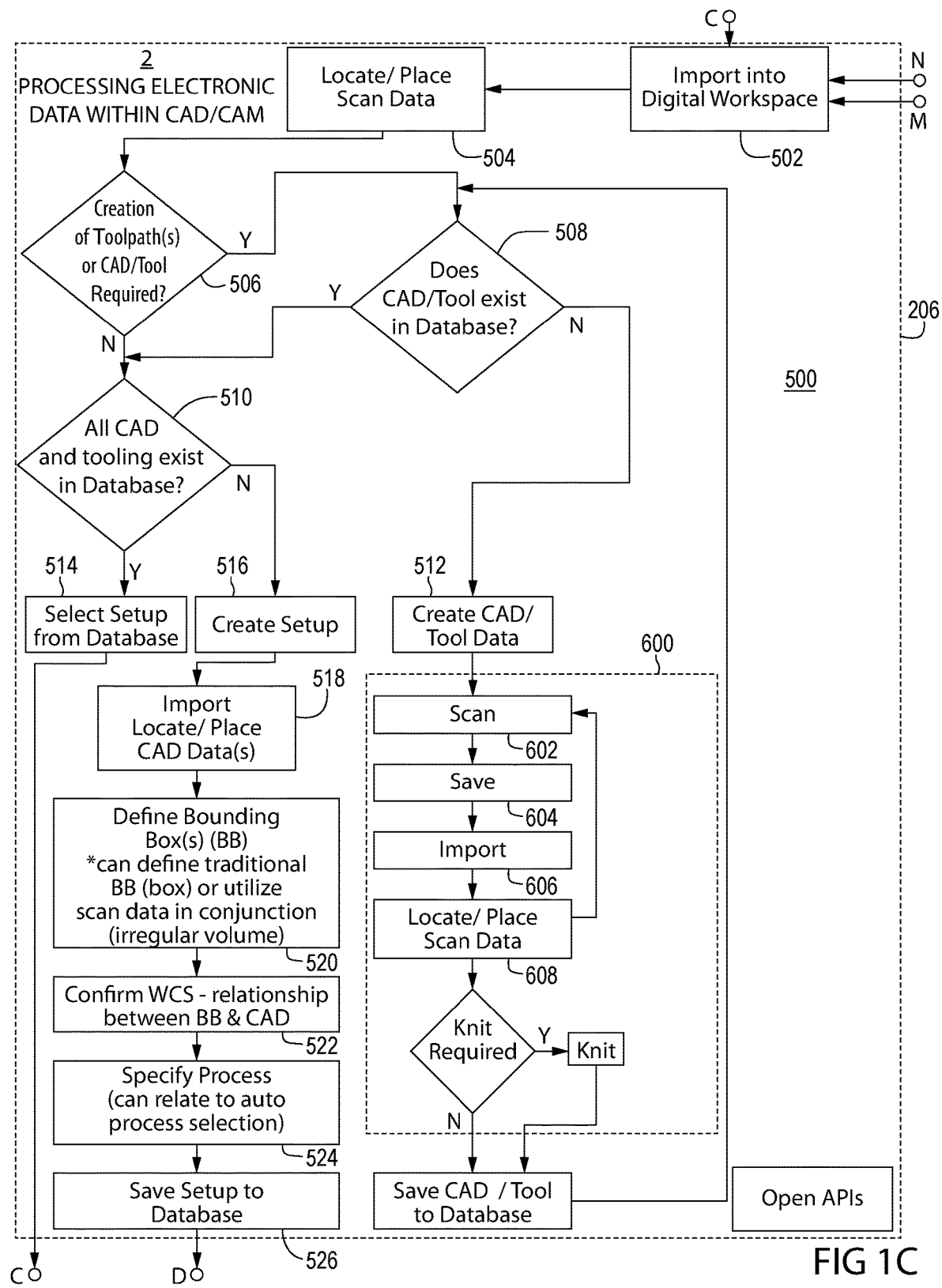
Figure 1D:
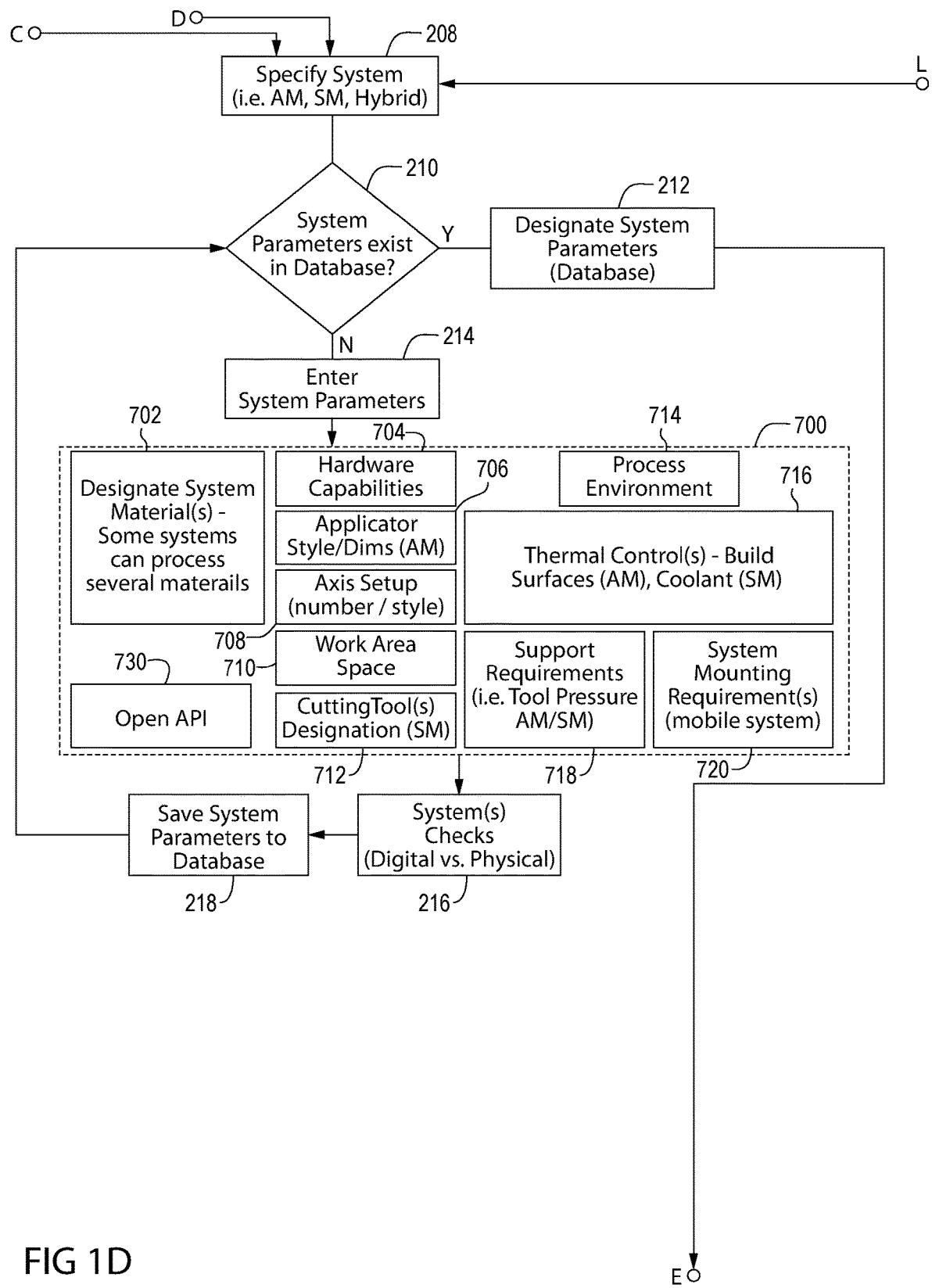
Figure 1E:
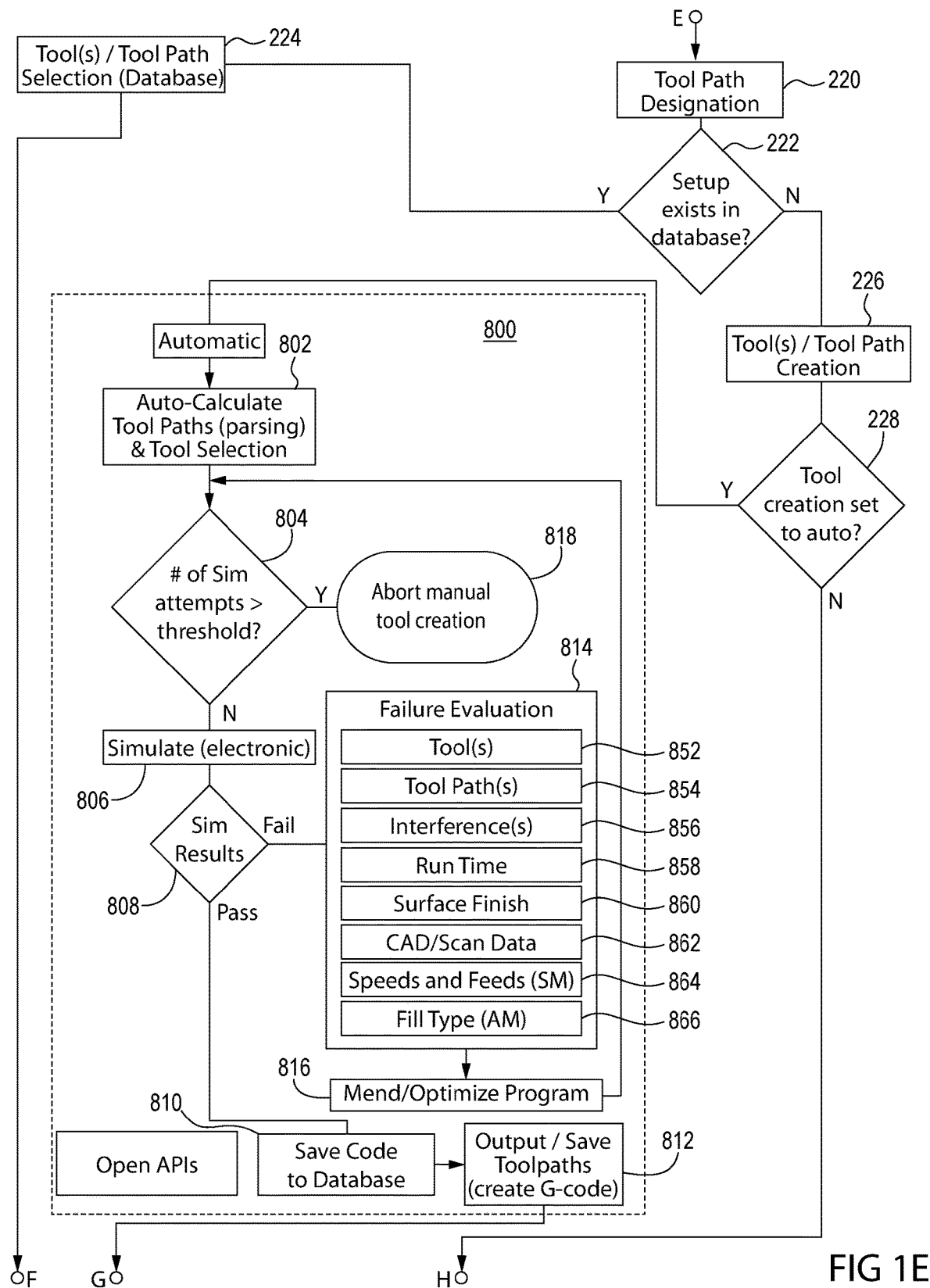
Figure 1F:
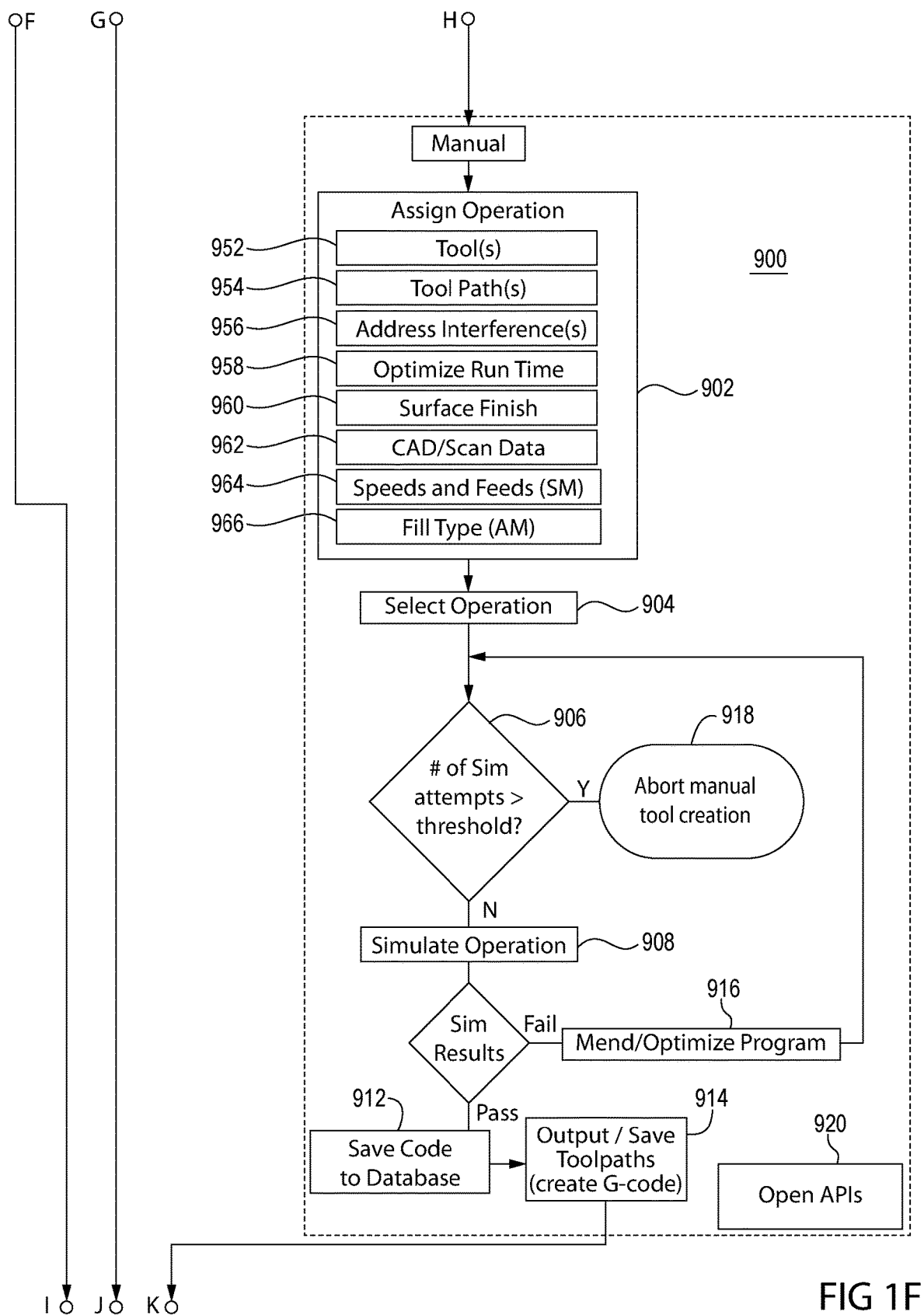
Figure 1G:
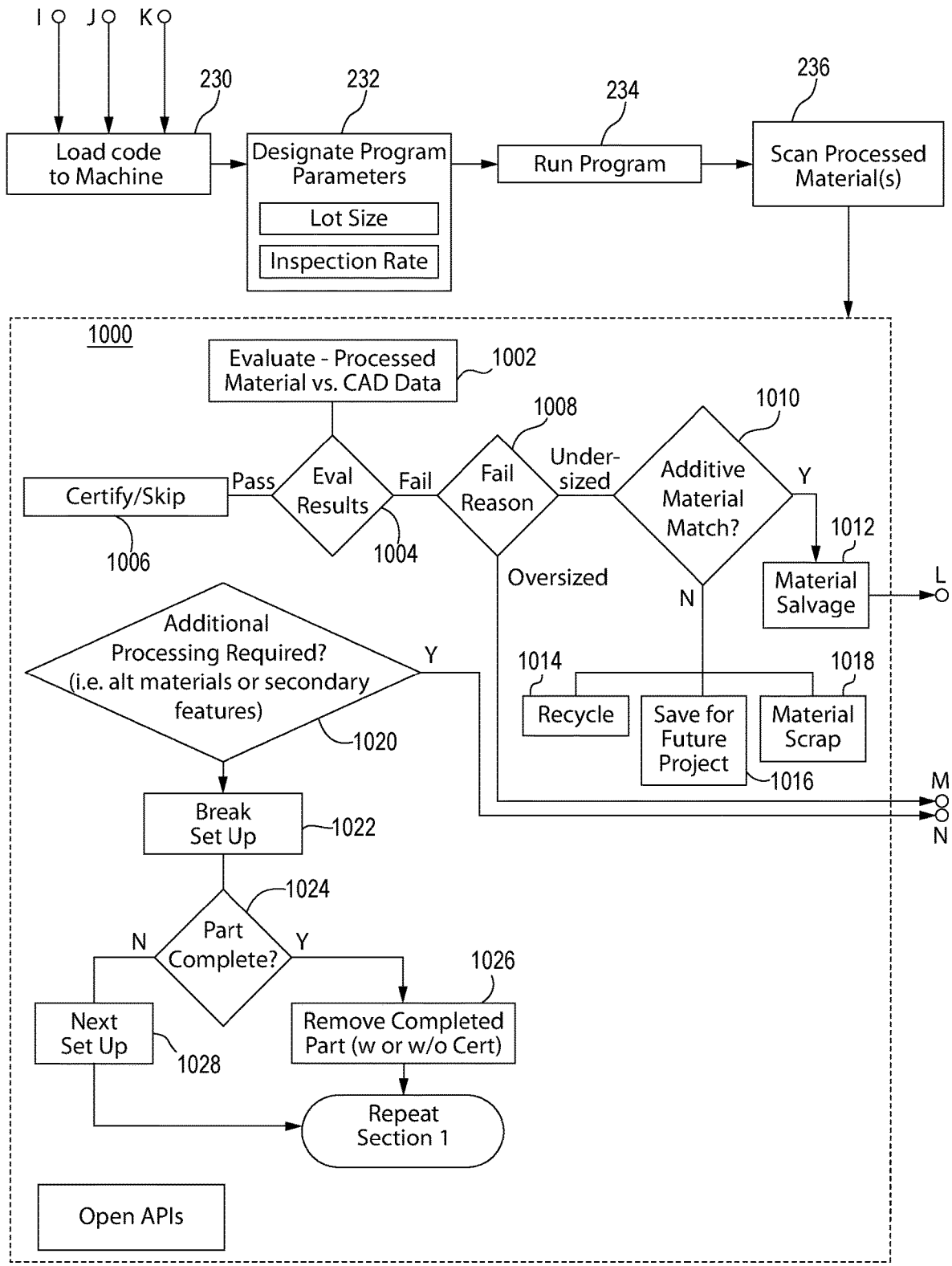

This description of the exemplary embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, unless expressly described otherwise. The term "operatively coupled" is such a coupling or connection that allows the pertinent structures to operate as intended by virtue of that relationship. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. When only a single machine is illustrated, the term "machine" shall also be taken to include any collection of machines that individually or jointly execute a set (or multiple sets) of instructions to perform any one or more of the methodologies discussed herein. The term "operatively connected" is such an attachment, coupling or connection that allows the pertinent structures to operate as intended by virtue of that relationship.

In the following, various embodiments are described with respect to the claimed systems as well as with respect to the claimed methods. Features, advantages, or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for CAM manufacturing. In various embodiments, a CAM manufacturing system includes an integrated scanner and associated computing system. The integrated scanner is configured to perform scanning of one or more elements located within, attached to, and/or otherwise associated with the CAM manufacturing system. For example, in some embodiments, the integrated scanner is configured to perform scanning of a workpiece (e.g., raw material, scrap material, partially manufactured part, completely manufactured part, etc.), a tool, and/or other components of a CAM manufacturing system. The associated computing system is configured to receive input from the integrated scanner and generate one or more control instructions for operation of the CAM manufacturing system based on the input from the integrated scanner. The instructions can include, but are not limited to, initial toolpaths or control instructions, modified toolpaths or control instructions, and tool-replacement instructions.

Figure 2:
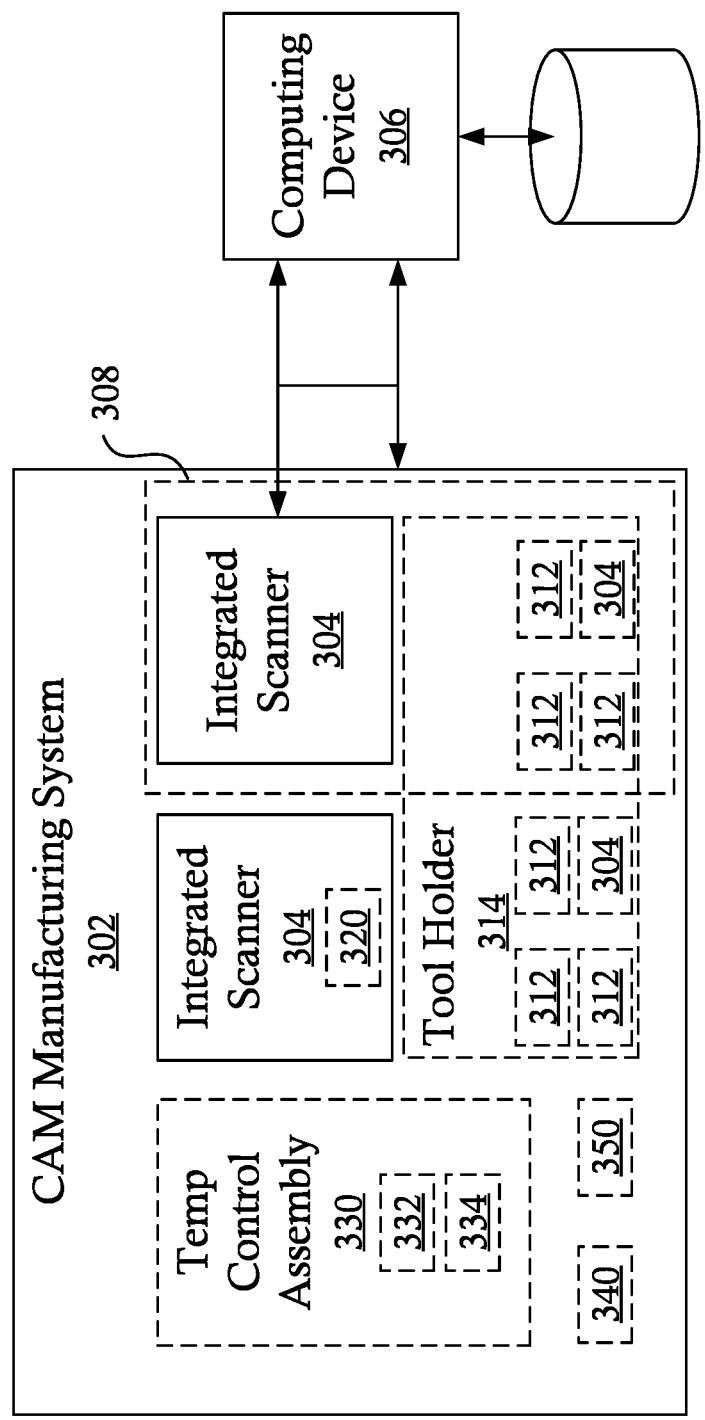
FIG. 2 is a system diagram illustrating various portions of a CAM system including integrated scanning, in accordance with some embodiments.
Figure 3:
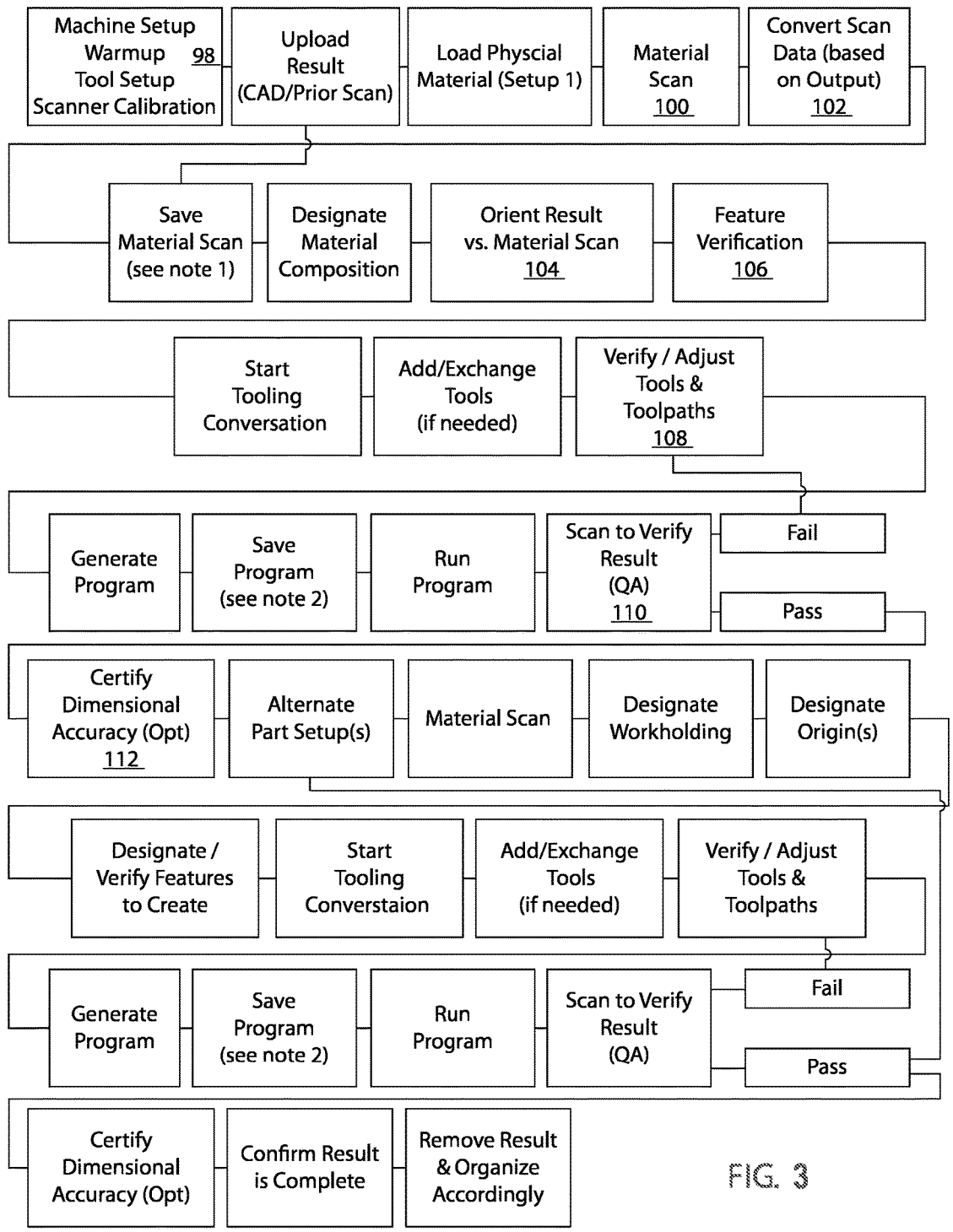
FIG. 3 is a flowchart illustrating a method of subtractive machining utilizing a CAM system including an integrated scanner, in accordance with some embodiments.
Figure 4:
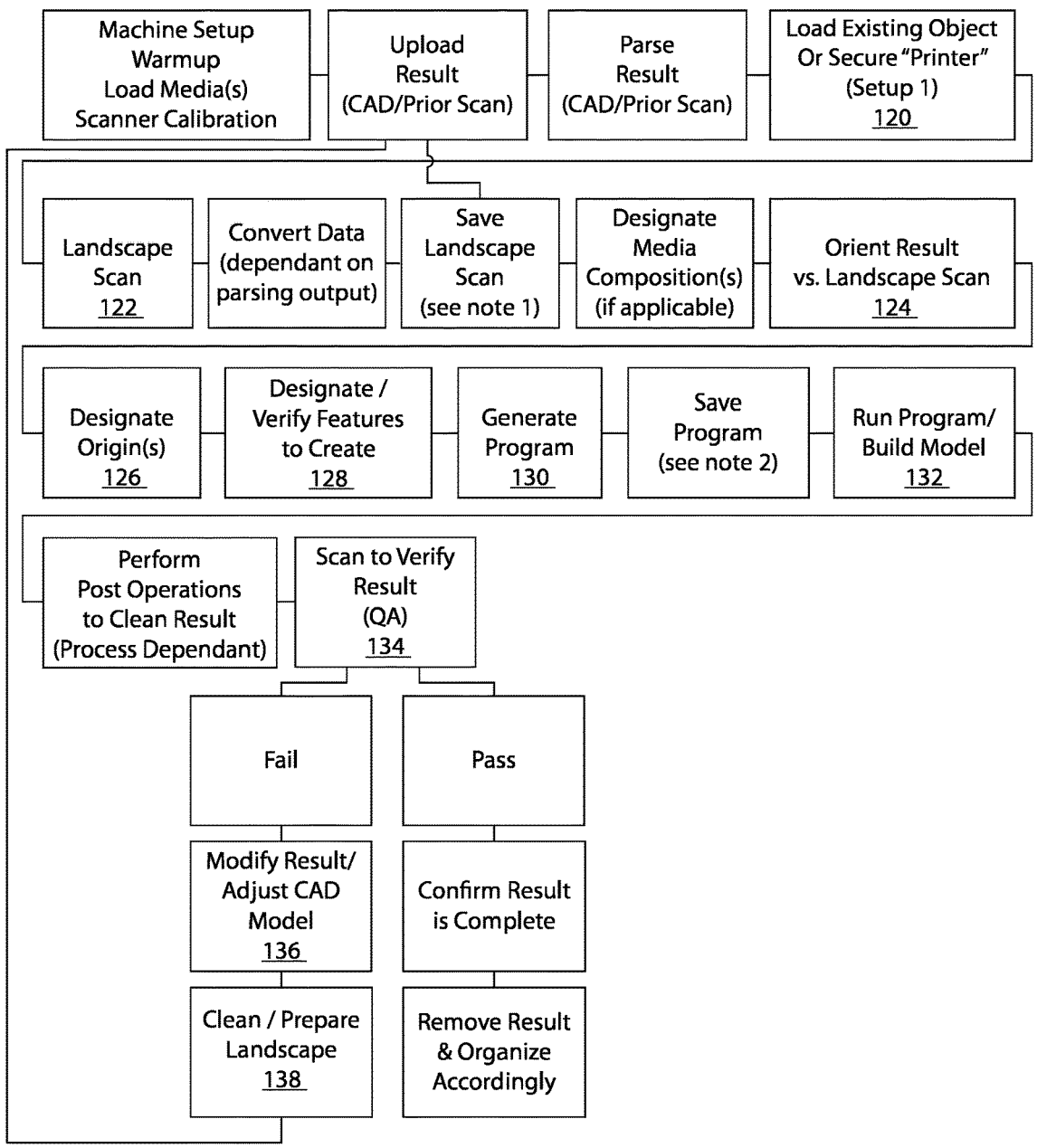
FIG. 4 is a flowchart illustrating a method of additive machining utilizing a CAM system including an integrated scanner, in accordance with some embodiments.

FIG. 2 is a system diagram illustrating various portions of a CAM system 300 including integrated scanning, in accordance with some embodiments. The CAM system 300 includes a CAM manufacturing system 302, an integrated scanner 304, and an associated computing device 306. The CAM manufacturing system 302 includes computer controlled machinery configured to automatically generate a part or product, for example, from a material positioned within a working area 308 (i.e., a substrative manufacturing process) and/or through addition of a material within the working area 308 (i.e., an additive manufacturing process).

The working area 308 can include at least one working arm 310 configured to hold one or more tools 312. The working arm 310 includes one or more movable portions configured to allow movement and operation of a held tool 312 within the working area to perform one or more manufacturing tasks. The tools 312 can include any suitable tools for use in the CAM manufacturing system 302, such as, for example, cutting tools, finishing tools, drilling tools, subtractive manufacturing tools, additive manufacturing tools, etc. In some embodiments, the one or more tools 312 can be positioned within a tool holder 314 positioned within and/or outside of the working area 308. In some embodiments, one or more portions of the existing CAM manufacturing system are configured to perform scanning functions. For example, in some embodiments, a scanner mounted in and/or retained in a tool holder 314 can be configured to interact with other elements of the CAM system 300 to perform scan functions, such as, for example, performing one or more surface scanning functions as described in greater detail below. As another example, in some embodiments, a scanner coupled to and/or integrated with an applicator in an additive manufacturing system is configured to perform one or more scanning functions, as described in greater detail below.

The CAM manufacturing system 302 may include any suitable number of control axis. For example, in some embodiments, the CAM manufacturing system 302 is a three-axis system configured to provide control of a working arm 310 within a three-dimensional working area 308. As another example, in some embodiments, the CAM manufacturing system 302 includes more than three-axes, with at least one additional axis being defined by a workpiece support fixture (e.g., a holding feature) configured to provide movement of the workpiece relative to and/or independent of movement of the working arm 310. Although embodiments are generally discussed herein including a three-axis CAM manufacturing system, it will be appreciated that the systems and methods may be configured to incorporate each axis of operation provided by a CAM manufacturing system 302.

In some embodiments, the CAM system 300 includes an integrated scanner 304. The integrated scanner 304 is configured to obtain a scan, e.g., a surface scan, of one or more elements positioned within and/or used by the CAM manufacturing system 302. For example, in some embodiments, the integrated scanner 304 is configured to obtain a scan of a target material, partially manufactured part or product, or fully manufactured part or process (collectively referred to herein as a "workpiece"). As another example, in some embodiments, the integrated scanner 304 is configured to obtain a scan of a tool 312 positioned within a working arm 310 and/or within a tool holder 314. It will be appreciated that the integrated scanner 304 can be configured to obtain a scan of any suitable portion, component, element, etc. included in and/or machined by the CAM manufacturing system 302.

In some embodiments, the integrated scanner 304 includes a surface scanning element. Suitable surface scanning elements can include contact scanning elements (e.g. contact probes configured to generate signals in response to sensed surface topography) and/or non-contact scanning elements (e.g., two-dimensional (2D) and/or three-dimensional (3D) image capture devices, non-visible spectrum imaging devices (e.g. radar, lidar, ultrasound, etc.), high-granularity imaging devices (e.g., atomic force microscopy (AFM), chromatic dispersion profilometry (CDP), laser scanning confocal microscopy (LSCM), scanning electron microscopy (SEM), transmission electron microscopy (TEM), white light interferometry (WLI), blue light 3D scanners, wide-area 3D patterned light measurement (VR), and/or any other suitable surface imaging element. In some embodiments, the integrated scanner 304 includes a sub-surface scanning element capable of imaging a sub-surface portion of the workpiece.

In some embodiments, the integrated scanner 304 can include a form factor configured to be held and/or operated by the working arm 310 of the CAM manufacturing system 302. For example, in some embodiments, a contact probe can include a tool interface portion configured to be coupled to the working arm 310 of the CAM manufacturing system 302. The CAM manufacturing system 302 can be configured to position the contact probe in contact with a surface to be scanned and move the contact probe to obtain the surface scan. In some embodiments, the integrated scanner 304 includes a scanning element that is mounted to a portion of the CAM manufacturing system 302 separate from the working arm 310.

In some embodiments, the integrated scanner 304 is configured to obtain scan data for a workpiece and/or a tool. For example, in some embodiments, the integrated scanner 304 includes a contact probe configured to be positioned in contact with a workpiece and/or a tool. As another example, in some embodiments, the integrated scanner 304 includes a non-contact scanning element configured to be positioned such that the workpiece and/or tool is positioned within a field of view of the non-contact scanning element.

In some embodiments, the integrated scanner 304 includes two or more integrated scanners. For example, in some embodiments, a first integrated scanner and a second integrated scanner can be used in conjunction to provide multi-functionality scanning and/or to increase scanning speed. As another example, in some embodiments, a first integrated scanner can include a dynamic (e.g., movable) scanner positioned within a working area 308 of the CAM manufacturing system 302 and a second integrated scanner can include a fixed scanner having a field of view including a spindle of the working arm 310. The first integrated scanner can be configured to obtain scan data of a workpiece positioned within the working area 308 and the second integrated scanner can be configured to obtain scan data of a tool positioned within the spindle of the working arm 310. In some embodiments, the spindle is configured to rotate at a predetermined position to allow scanning and characterization of the tool 312 by the second integrated scanner.

In some embodiments, the integrated scanner 304 is configured to obtain scan data for a workpiece positioned within the working area 308 and tools 312 positioned within the tool holder 314. For example, in some embodiments, the tool holder 314 can be positioned within the working area 308 such that an integrated scanner 304 positioned or positionable to scan the working area 308 would include the tool holder 314 and the associated tools 312 within a field of view or scannable area. In some embodiments, the tool holder 314 and associated tools 312 can be characterized as objects within the working area 308, as discussed below with respect to FIGS. 1A-1G. In some embodiments, the condition of one or more tools 312 can be determined by obtaining scan data of a workpiece (e.g., a material being cut or processed by a tool 312) and performing an analysis of a cut result.

The integrated scanner 304 is configured to provide real-world (e.g. actual) scan data of a workpiece and/or a tool for use in generation of CAD/CAM data, as discussed in greater detail below. High-accuracy scan data provided refined automation of the CAM data generation process and simplifies system interactions required to provide high precision results. For example, in subtractive manufacturing systems, scanning of one or more tools provides accuracy for proposed tooling programs and management of material removal during CNC machining. As another example, in additive manufacturing, an integrated scanner can provide a landscape scan of a base or supporting structure to provide for high-accuracy deposition of additive manufacturing materials.

In some embodiments, the integrated scanner 304 is configured to provide scan data of one or more tools and the associated computing device 306 is configured to perform a tool wear determination process. A tool wear determination process can include generation of one or more CAD models of a scanned tool and evaluation of the generated CAD models, for example, as discussed with respect the integrated scanning method 400, the CAD/CAM data generation process, and/or the processed material evaluation process 1000 discussed below in conjunction with FIGS. 1A-1G. A tool wear determination process can be configured to provide accuracy in tool setup and/or calibration and/or can detect tool wear prior to, during, and/or after use of a tool for a manufacturing process.

In some embodiments, the integrated scanner 304 is configured to perform one or more safety scans prior to, during, and/or after a manufacturing process implemented by the CAM manufacturing system 302. For example, the integrated scanner can be configured to detect fire hazards, freezing hazards, gases, fumes, shrapnel, cast-off, and/or any other suitable hazards. In some embodiments, the integrated scanner 304 can be configured to activate one or more safety systems, such as an integrated safety system or a remote safety system. The safety systems can be configured to mitigate or address one or more detected hazards, for example, extinguishing fire hazards, thawing freeze hazards, venting, collecting, or filtering gases and fumes (e.g., utilizing any suitable filtration system, such as a sedimentation chamber, cyclone separator, rotating scrubber, venturi scrubber, spray chamber, dry electro filter, wet electro filter, cloth filter, air evacuation systems, etc. having any suitable rating, such as, for example, NEMA or IP ratings), raising or lowering barriers, etc. In some embodiments, the integrated scanner 304 is configured to regulate and/or activate environmental controls, such as self-contained environments, contained environments, high or low pressure environments, vacuum environments, etc.

In some embodiments, the integrated scanner 304 includes an on-board scanner integrated with and/or coupled to the CAM manufacturing system 302. The integrated scanner 304 may include one or more of a wired (e.g. electrically integrated, pluggable, etc.) scanner, a wireless (e.g., wireless power, battery operated, etc.) scanner, and/or a hybrid (e.g., wired power and wireless communication) scanner. In some embodiments, the integrated scanner 304 includes a removable battery back for primary and/or secondary power.

In some embodiments, the integrated scanner 304 includes a fixed mounting to one or more additional elements of the CAM system 300. For example, in some embodiments, the integrated scanner 304 is coupled to a portion of the CAM manufacturing system 302 to provide a fixed field of view and a fixed position with respect to the CAM manufacturing system 302. As another example, in some embodiments, the integrated scanner 304 is coupled in a predetermined position and/or orientation to a portion of the CAM manufacturing system 302 that is configured for movement. For example, as discussed herein, the working arm 310 of the CAM manufacturing system may be configured to move at least within a predetermined working area 308. The integrated scanner 304 may be coupled to the working arm 310 in a fixed orientation relative to the working arm 310 such that movement of the working arm 310 results in movement of the integrated scanner 304 with respect to the working area 308.

In some embodiments, the integrated scanner 304 includes a dynamic mounting to one or more additional elements of the CAM system 300. For example, in some embodiments, the integrated scanner 304 includes a mounting element that is coupled to a fixed portion of the CAM manufacturing system 302 and an adjustment element that is configured to provide movement of a portion of the integrated scanner 304 (e.g., a sensor, lens, etc.) relative to the mounting element and the fixed portion of the CAM manufacturing system 302. As another example, in some embodiments, the integrated scanner 304 includes a mounting element that is coupled to a portion of the CAM manufacturing system 302 that is configured for movement, such as the working arm 310 as discussed above. The integrated scanner 304 may additionally include an adjustment element that is configured to provide movement of a portion of the integrated scanner 304 relative to the mounting element, such that integrated scanner 304 may be moved relative to the working area 308 via movement of the working arm 310 and may additionally be moved relative to the working arm 310 itself. Although certain embodiments are discussed herein, it will be appreciated that any suitable combination of fixed and/or adjustable mounting elements or locations may be provided by the CAM system 300 and/or the integrated scanner 304.

In various embodiments, movement of the integrated scanner 304 may be provided in any suitable axis of movement. For example, the integrated scanner 304 may be configured to translate linearly within a three-dimensional space on one or more axes (e.g., horizontal, vertical, longitudinal; up/down, forward/backward, left/right, etc.) and/or may be configured to rotate around one or more axes (e.g., pitch, roll, yaw; normal axial rotation, transverse axial rotation, longitudinal axial rotation, etc.). The integrated scanner 304 may include any suitable degrees of freedom up to and including six degrees of freedom with respect to one or more portions of the CAM system 300. In some embodiments, the integrated scanner 304 may include a first set of degrees of freedom (e.g., six degrees of freedom) with respect to a first portion of the CAM system 300 and a second set of degrees of freedom (e.g., three degrees of freedom including pitch, roll, and yaw) with respect to a second portion of the CAM system 300.

The integrated scanner 304 may be mounted to one or more portions of the CAM system 300 using any suitable mounting mechanism. For example, in some embodiments, the integrated scanner 304 may include a spindle column mounting mechanism configured to mount the integrated scanner 304 to the working arm 310 in a predetermined arrangement (referred to herein as a "buddy system" mounting). The predetermined mounting of the integrated scanner 304 may be position the integrated scanner with respect to the working arm 310 to provide a field of view configured to allow for characterization of work surfaces, applicators, tools, and/or other elements located at predetermined locations with respect to the working arm 310 (e.g., coupled to a distal end of the working arm 310, located adjacent to a distal end of the working arm 310, etc.).

In some embodiments, the integrated scanner 304 may be positioned and/or positionable to provide a tool-specific field of view. For example, in some embodiments, the integrated scanner 304 is coupled to the working arm 310 at a predetermined position configured to provide a field and/or angle of view optimized for one or more tools 314 that may be coupled to and/or operated by the working arm 310. In some embodiments, the position of the integrated scanner 304 is adjustable to select a tool-specific field and/or angle of view based on a tool 314 currently coupled to and/or in use by the working arm 310. For example, a first tool may have a first profile defining a first angle of clearance and a second tool may have a second profile defining a second angle of clearance. The position of the integrated scanner 304 may be adjusted to provide an optimized field and angle of view for the first angle of clearance when the first tool is in use and adjusted to provide an optimized field and angle of view for the second angle of clearance when the second tool is in use. It will be appreciated that the position of the integrated scanner 304 may be adjustable in one or more degrees of movement to provide an optimized view for one or more tools while maintaining the integrated scanner 304 in a position that does not interfere with operation of the associated tool.

The integrated scanner 304 may be positioned at a scanning location using any suitable mechanism. For example, the integrated scanner 304 may include a mounting mechanism configured to mount at least a portion of the integrated scanner 304 to one or more portions of the CAM manufacturing system 302, such as, for example, a position outside of a working area 308, a position within a working area 308, a portion of the tool holder 314, a portion of the working arm 310, etc. As another example, the integrated scanner 304 may include a mounting and/or positioning mechanism configured to mount or position the integrated scanner 304 without a direct and/or mechanical coupling to the CAM manufacturing system 302. For example, the integrated scanner 304 may include a mounting and/or positioning mechanism such as a tripod, table mounting, room mounting, etc., which positions the integrated scanner 304 outside of the CAM manufacturing system 302 at a location that includes a portion of the working area 308 within the field of view of the integrated scanner 304.

In some embodiments, the integrated scanner 304 includes one or more protective elements 320 coupled to and/or formed integrally therewith. A Protective element 320 may include, but is not limited to, dampening elements, solid-core components, seals, shields, etc. The integrated scanner 304 may include any combination of protective elements 320 configured to provide protection from one or more environmental and/or operational impacts generated within the CAM system 300. For example, the integrated scanner 304 may include one or more dampening elements configured to dampen and/or eliminate vibrations transmitted from the CAM manufacturing system 302 to the integrated scanner 304, such as vibrations generated by actuation and/or process vibrations. As another example, the integrated scanner 304 may include one or more solid-core components that are configured to resist transferred vibrations. As yet another example, the integrated scanner 304 may include one or more shielding and/or sealing elements configured to protect the integrated scanner 304 (and/or one or more components thereof) from environmental and/or operational contaminants, such as: providing a liquid-proof sealing to protect from water, mist, and/or other liquid process materials; providing lens clarity to prevent environmental and/or operational contaminants from obscuring the lens (e.g., wiper systems, protective films, chemical sealant/repellant, etc.); and/or providing a washdown enclosure to allow for cleaning and/or protection of the integrated scanner 304, such as via an auto-hatch and/or positive air pressure enclosure.

Selection of a tool 312 and operation of the working arm 310 occurs according to one or more instructions received by the CAM manufacturing system 302. In some embodiments, the CAM manufacturing system 302 is configured to receive control instructions from an associated computing device 306. The associated computing device can include any suitable computing device (for example, a computing device as described below in conjunction with FIG. 6). In some embodiments, the computing device 306 is configured to receive scan data from the integrated scanner 304 and utilize the scan data to generate control instructions for the CAM manufacturing system 302. For example, as discussed in further detail below, the computing device 306 can be configured to generate initial toolpath control instructions, modified toolpath control instructions, and/or tool utilization instructions in response to data received from the integrated scanner 304.

In some embodiments, and as discussed in greater detail below, the computing device 306 is configured to provide automated process and/or operational controls for operation of the CAM manufacturing system 302 and/or the integrated scanner 304. In some embodiments, the computing device 306 may include one or more data storage elements, such as a database, storing one or more data structures representative of predetermined automated processes. For example, in some embodiments, the computing device 306 may include and/or be in communication with a database including a plurality of predefined manufacturing data structures. The predefined manufacturing data structures may include data configured to provide operation of a CAM manufacturing system 302 to generate a predefined component, workpiece, modification, correction, etc. For example, in some embodiments, a predefined manufacturing data structure includes CAD models, CAM tool paths, and/or other operational data or controls configured to cause the CAM manufacturing system 302 to generate a predetermined component from a bulk material, generate a predetermined modification of an existing component, and/or perform any other suitable manufacturing task.

In some embodiments, tool holder 314 is configured to provide an electromagnetic coupling for one or more elements disposed therein and/or coupled thereto. For example, the tool holder 314 may be configured to provide an electromagnetic coupling for one or more tools 312 disposed in one or more tool receptacles defined by the tool holder 314 and/or an integrated scanner 304 coupled to and/or disposed in the tool holder 314. The tool holder 314 may be configured to provide a direct (e.g., wired, contact, etc.) and/or an indirect (e.g., wireless, non-contact, etc.) electromagnetic coupling configured to transfer power signals, data signals, and/or any other suitable electromagnetic signal.

As one non-limiting example, in some embodiments, the tool holder 314 is configured to provide power and data transfer to one or more elements, such as one or more tools 312 and/or an integrated scanner 304, disposed within one or more receptacles defined by the tool holder 314. The one or more receptacles may each include contact elements configured to interface with contact elements formed on a portion of a tool 312 and/or an integrated scanner 304. The contact elements may be configured to provide power and/or data transfer, such as providing power to charge a power source (e.g., battery, capacitor, etc.) and/or providing data transfer from a storage element formed integrally with the tool 312 and/or the integrated scanner 304. As another example, in some embodiments, the tool holder 314 may be configured to provide wireless power and/or data transfer with one or more tools 312 and/or an integrated scanner 304, for example, via an inductive coupling, a wireless data coupling, and/or a combination thereof.

In some embodiments, the tool holder 314 includes one or more elements configured to provide power and/or data transfer to/from one or more elements disposed within one or more receptacles. For example, the tool holder 314 may include a power element configured to generate and transfer power to one or more elements via direct (e.g., contact) and/or indirect (e.g., wireless, inductive, etc.) power transfer mechanisms. The power element of the tool holder 314 may include a wired, battery, and/or wireless power source. For example, the tool holder 314 may be coupled to an electrical system of the CAM manufacturing system 302, may include a battery (e.g., integrated, replaceable, rechargeable, etc.) power source, and/or may be coupled to a second wireless power source (e.g., a power source positioned outside of the CAM manufacturing system 302). Similarly, the tool holder 314 may include a data transfer element configured to provide data transfer to and/or from one or more data elements integrated with a tool 312 and/or an integrated scanner 304. The data transfer element may include a wired and/or wireless communication mechanism and protocol.

As one non-limiting example, in some embodiments, the tool holder 314 includes an inductive coupling system configured to provide power and data transfer between one or more elements of the tool holder 314 and one or more elements (e.g., tool 312, integrated scanner 304) disposed within a receptacle of the tool holder 314. The inductive coupling system may include a mechanism and protocol configured to provide power and data transfer through an inductive link, such as, for example, radio-frequency inductive coupling (e.g., RFID). As another non-limiting example, in some embodiments, the tool holder 314 includes an inductive coupling system configured to provide power transfer and a wireless data system configured to provide wireless transfer of data. The inductive coupling system may include a mechanism configured to provide power transfer through an inductive link, such as, for example, radio-frequency coupling, and the wireless data system may include a mechanism configured to provide wireless data transfer, such as a radio-frequency mechanism, optical mechanism, etc. Although specific embodiments are discussed herein, it will be appreciated that any suitable power transfer and/or data transfer mechanisms may be utilized by the tool holder 314.

In some embodiments, one or more receptacles of the tool holder 314 include a profile configured to facilitate (e.g., promote) charging of and/or data transfer to/from an element positioned within the corresponding receptacle. For example, in some embodiments, a receptacle may include a cross-sectional area configured to receive a portion of a tool 312, such as a tool adapter portion, in a predetermined orientation configured to facilitate coupling of electrical elements of the tool 312 to electrical elements of the tool holder 314, such as positioning the tool 312 for direct coupling of contact elements and/or advantageously positioning the tool 312 for indirect coupling of wireless elements.

In some embodiments, the CAM manufacturing system 302 includes integrated additive and subtractive manufacturing elements. For example, in some embodiments, the CAM manufacturing system 302 includes a first manufacturing assembly, e.g., a first working arm, a first tool holder, a first set of tools, etc. configured to provide or facilitate subtractive manufacturing processes and a second manufacturing assembly, e.g., a second working arm, a second tool holder, a second set of tools, etc. configured to provide or facilitate additive manufacturing processes. As another example, in some embodiments, the CAM manufacturing system 302 includes a first set of tools couplable to a working arm 310 and configured to provide or facilitate subtractive manufacturing and a second set of tools couplable to the working arm 310 and configured to provide or facilitate additive manufacturing.

In some embodiments, the set of tools 312 and/or the tool holder 314 are configured to provide one or more functionalities to a CAM manufacturing system 302. For example, in some embodiments, a set of subtractive tools may be disposed within a tool holder 314 that is configured to be integrated into an additive manufacturing CAM system to provide one or more subtractive manufacturing functionalities. Similarly, in some embodiments, a set of additive tools may be disposed within a tool holder 314 that is configured to be integrated into a subtractive manufacturing CAM system to provide one or more additive manufacturing functionalities. In some embodiments, the tool holder 314 includes one or more electronic elements configured to communicate with the CAM manufacturing system 302 and/or the computing device 306 to identify and enable the added manufacturing capabilities.

In some embodiments, the integrated scanner 304 is configured to obtain tool profiles and/or tool information. For example, in some embodiments, the integrated scanner 304 is configured to obtain scan data for one or more tools 314 associated with the CAM system 300. The CAM system 300 may include one or more targets that may be read and/or identified by the integrated scanner 304 and/or software configured to process an input generated by the integrated scanner 304. The scanner targets may be configured to provide reference points to determine tool identities and/or tool locations.

In some embodiments, one or more tool profiles may be associated with a tool 314 in one or more software applications, for example, one or more software applications executed by the computing device 306. The integrated scanner 304 may be configured to obtain scan data including tool identification and/or tool position data. The computing device 306 may be configured to receive the scan data and obtain a digital tool profile corresponding to the identified tool 314 in one or more software applications, such as a CAD application, CAM application, etc. The computing device 306 may utilize the tool profile in control, planning, and/or other operations related to operation of a computer-controlled CAD/CAM system, such as the CAM system 300.

Although embodiments are illustrated herein including a CAM manufacturing system 302 having an integrated scanner 304 and a separate associated computing device 306, it will be appreciated that the components of the CAM system 300 can be combined, duplicated, augmented, and/or omitted. For example, in some embodiments, the associated computing device 306 can be omitted and processing steps, such as implementation of one or more of the methods discussed below, can be performed by a processor and associated components integrated with the CAM manufacturing system 302 and/or the integrated scanner 304. As another example, in some embodiments, the integrated scanner 304 can be separate from and mountable/positionable with respect to the CAM manufacturing system 302.

For example, in some embodiments, the CAM manufacturing system 302 can include an additive manufacturing system having an embedded system, for example, a processor configured to read instructions from a memory unit storing software, to parse CAD data and generate associated functional code to build/produce products or parts represented by the CAD data. In some embodiments, the operating software and the parsing software are provided as a single integrated embedded software package configured to extend the CAM manufacturing process.

In some embodiments, the disclosed CAM manufacturing system 302 may include a temperature control assembly 330 configured to monitor, maintain, and/or control a temperature of at least a portion of the working area. For example, in some embodiments, a temperature control assembly 330 may be configured to monitor, maintain, and/or control a temperature of an environment of the working area 308 (e.g., ambient temperature), the temperature of one or more elements of the CAM manufacturing system 302 positioned within the working area 308 (e.g., a platen surface, a working arm 310, one or more tools 312, etc.), and/or the temperature of workpiece positioned within the working area 308.

The temperature control assembly 330 may include one or more temperature sensors 332 configured to obtain temperature data for the working area 308, e.g., ambient temperature, one or more elements of the CAM manufacturing system 302, the workpiece, etc. The one or more temperature sensors 332 may include any suitable temperature sensor such as, for example, a radiant sensor, a contact sensor, an electromagnetic sensor, etc. In some embodiments, the temperature control assembly 330 may include one or more sensors selected and/or configured based on an associated manufacturing process. For example, in embodiments including a CAM manufacturing system 302 configured for additive manufacturing, the temperature control assembly 330 may include a temperature sensor 332 configured to monitor a temperature of a platen (or portions thereof). As another example, in embodiments including a CAM manufacturing system 302 configured for subtractive manufacturing, the temperature control assembly 330 may include one or more temperature sensors 332 configured to monitor a temperature of a workpiece, one or more tools, one or more exposed surfaces and/or material masses, etc.

In some embodiments, the temperature control assembly 330 is configured to maintain and/or control a temperature of the working area 308 and/or one or more elements within the working area 308. For example, in some embodiments, the temperature control assembly 330 includes one or more heating/cooling elements 334 configured to heat and/or cool the ambient temperature of the working area 308. As another example, in some embodiments, the temperature control assembly 330 includes one or more heating/cooling elements 334 configured to heat and/or cool a surface located within and/or defining the working area 308, such as platen. As yet another example, in some embodiments, the temperature control assembly 330 is configured to operate one or more coolant application processes to apply a coolant to one or more elements, such as a workpiece, tool, etc. located and/or locatable within the working area 308.

In some embodiments, the temperature control assembly 330 is configured to apply one or more temperature control processes to facilitate manufacturing of a workpiece. For example, in embodiments including additive manufacturing, the temperature control assembly 330 may be configured to control a temperature of a platen utilized as a base for the additive manufacturing process. The temperature control assembly 330 may be configured to cool the platen during a first stage of an additive manufacturing process to increase adhesion of additive materials and/or heat the platen during a second stage of the additive manufacturing process to release the workpiece from the platen.

The temperature control assembly 330 may include any suitable heating/cooling elements 334 configured to heat and/or cool one or more environmental elements (e.g., ambient temperature, temperature of a surface, temperature of a workpiece, etc.). For example, in some embodiments, the temperature control assembly 330 may include one or more fans or blowers configured to provide air movement to cool the working area 308 and/or an element positioned within the working area 308. As another example, in some embodiments, the temperature control assembly 330 may include one or more heating elements configured to heat a surface, e.g., a platen, positioned within and/or partially defining the working area 308. As yet another example, in some embodiments, the temperature control assembly 330 may include one or more heat sinks configured to collect and/or dissipate heat from one or more elements positioned within and/or defining the working area 308. Portions of temperature control assembly 330 may be selectively controllable (e.g., configured to be toggled at least between an active and inactive state) and/or may be configured to provide active and/or passive continuous operation.

In some embodiments, the CAM system 300 includes one or more sensors 340 configured to detect the presence of one or predetermined elements or materials. The one or more sensors 340 may be integrated into any portion of the CAM system 300, such as the CAM manufacturing system 302, and may include any suitable sensor type. For example, in various embodiments, the one or more sensors 340 may include, but are not limited to, mass or weight sensors configured to detect the presence of a material in a predetermined portion of the working area 308, material sensors configured to detect a predetermined material within the working area 308 (e.g., smoke detectors, gas-specific detectors, etc.), movement sensors configured to detect movement within one or more predetermined portions of the working area 308, electromagnetic sensors configured to detect electromagnetic fields and/or energy in the working area 308, ultrasonic sensors, etc. The one or more sensors 340 may be configured to detect the presence of materials in predetermined areas (such as portions of the working area 308 that are not occupied by workpiece as determined by CAD/CAM modeling as discussed above) and/or configured to detect the presence of one or more materials generally within a predetermined area (such as the working area 308). In some embodiments, the one or more sensors 340 may be configured to detect specific materials or material-types within the working area 308 (e.g., a sensor configured to detect magnetic materials, a sensor configured to detect liquids, etc.). As another example, a CAM manufacturing system 302 may include one or more sensors 340 configured to detect environmental elements, such as one or more specific gases, liquids, etc. It will be appreciated that any suitable sensor 340 may be integrated in any suitable portion of a CAM manufacturing system 302 to detect the presence of undesirable elements within a predetermined portion of the CAM manufacturing system 302.

In some embodiments, the CAM system 300 includes one or more reflective surfaces 350. The reflective surfaces 350 may be integrated with one or more components of the CAM system 300, such as the CAM manufacturing system 302, and/or may be defined by independent elements, such as reflective elements or objects having reflective surfaces positioned in and/or near a CAM manufacturing system 302. The integrated scanner 304 may be configured to utilize the one or more reflective surfaces 350 during a scanning process. For example, in some embodiments, the integrated scanner 304 is positioned and/or positionable to include one or more reflective surfaces 350 within a field of view of an image capture element. One or more reflective surfaces 350 may include surfaces configured to reflect electromagnetic energy in any of one or more wavelengths receivable by the integrated scanner 304, such as, for example, visible light (e.g., wavelengths of about 400-700 nm), ultraviolet (e.g., wavelengths of about 10-400 nm), infrared (e.g. wavelengths of about 700 nm-1 mm), etc. The reflective surfaces 350 may be integrated into one or more components of the CAM system 300, such as, for example, one or more portions of the CAM manufacturing system 302 (such as one or more surfaces defining a working area 308, the working arm 310, etc.), one or more tools 314, and/or one or more additional elements coupled to and/or integrated with the CAM system 300 (e.g., reflective objects positioned adjacent to and/or within the working area 308).

A reflective surface 350 may include a fixed position and/or may be moveable relative to one or more portions of the CAM manufacturing system 302 and/or the integrated scanner 304. For example, in some embodiments, a reflective surface 350 and an integrated scanner 304 may each be coupled to a fixed position with respect to the CAM manufacturing system 302, providing a fixed relative position between the integrated scanner 304 and the reflective surface 350. The fixed relative position is configured to include the reflective surface 350 within a field of view of the integrated scanner 304. As another example, in some embodiments, a reflective surface 350 may be formed integrally with a surface of the CAM manufacturing system 302 and the integrated scanner 304 may be coupled to and/or formed integrally with the working arm 310 such that integrated scanner 304 is moveable relative to the reflective surface 350, which maintains a fixed position with respect to a working area 308 of the CAM manufacturing system 302. The integrated scanner 304, for example via the working arm 310, may be positioned relative to the reflective surface 350 such that the reflective surface 350 is located within a field of view of the integrated scanner 304.

In some embodiments, the CAM system 300 may include a plurality of reflective surfaces 350, each positioned and/or configured to provide a different angle and/or field of view. For example, in some embodiments, a first reflective surface, a second reflective surface, and an integrated scanner 304 may each be coupled to a portion of the CAM manufacturing system 302 at fixed positions. During operation of the CAM manufacturing system 302, the integrated scanner 304 may be configured to utilize one or more of the plurality of reflective surfaces based on one or more operational parameters, such as, for example, a position of the integrated scanner 304, a position of a working arm 310, a selected tool 314, parameters of a workpiece located within the working area 308, operations being performed within the working area 308, etc. It will be appreciated that any suitable parameters can be used to determine a subset of reflective surfaces to be used during a monitoring period.

As one non-limiting example, in some embodiments, the integrated scanner 304 may have a fixed field of view including each of the first reflective surface and the second reflective surface. The first and second reflective surfaces may be positionable (e.g., rotatable about one or more axes). Based on one or more operational parameters (such as the operation being performed within the working area 308, a selected tool 314, etc.), one of the first or second reflective surfaces may be positioned to provide an angle relative to the working area 308 and/or a target element (e.g., a workpiece, tool 314, etc.) configured to provide a reflection of the monitored component to the integrated scanner 304. The input received by the integrated scanner 304 may be filtered (e.g., via software implemented by the integrated scanner 304 and/or the computing device 306) to focus on a portion of input encompassing the reflective surface. In some embodiments, a reflective surface 350 may be utilized in conjunction with and/or alternatively to inclusion of a target element (e.g., workpiece, tool 314, etc.) directly within a field of view of an integrated scanner 304. For example, a reflective surface 350 may provide a correct or more desirable angle of view with respect to the monitored element, higher resolution, a clearer (e.g., less obstructed) view, etc.

As another non-limiting example, in some embodiments, the integrated scanner 304 may have an adjustable field of view including each of a first reflective surface and/or a second reflective surface. Based on one or more operational parameters, one of the first or second reflective surfaces may be positioned to provide an angle of view relative to a portion of a working area 308 and/or a target element (e.g., the tool 314) having a better view of the monitored component (e.g., correct angle, higher resolution, less obscured, etc.). The field of view of the integrated scanner 304 may be adjusted (e.g., via movement of a sensor, adjustment of a lens, etc.) to encompass only the reflective surface having the better view. Although specific embodiments are discussed herein, it will be appreciated that any suitable mechanical and/or computational process may be applied to filter or limit input received by the integrated scanner 304 to one or more reflective surfaces of interest within a field of view such as one reflective surface, two reflective surfaces, etc.

In some embodiments, the inclusion of one or more reflective surfaces 350 allows the integrated scanner 304 to obtain input (e.g., image data) from an angle and/or of an area that would otherwise not be visible to the integrated scanner 304. In addition, a reflective surface 350 may allow a single integrated scanner 304 to obtain input from multiple fields of view (e.g., simultaneously, sequentially, and/or selectively) during a single operation, allowing a single integrated scanner 304 to perform operations that otherwise would require multiple integrated scanners.

In some embodiments, the disclosed systems and methods can be applied to systems other than CAM systems, such as, for example, robotic surgery systems, robotic manipulation systems, remote manipulation systems, etc. The disclosed systems and methods can be adapted to provide characterization of mass, work surfaces, work-holding apparatus, work pieces, tools, etc. in conjunction with robotically operated systems. Such applications can include, but are not limited to, processes designed for large objects or masses, e.g., rooms or larger spaces having dedicated robotic arms for movement of large volumes, micro-applications such as robotic surgical systems, implant placement, on-call fabrication of implantable or other components, etc.

In some embodiments, the disclosed systems and methods can be adapted for generation of replacement and/or duplicate parts. For example, in some embodiments, the disclosed integrated scanner 304 can be configured to obtain a first scan of an existing object, such as an existing tube, vacuum formed component, machine formed component, etc. The first scan be used to generate a CAD model of the existing object, for example, according to integrated scanning method 400 and/or the CAD/CAM data generation method 500 discussed below. The generated CAD model of the existing object can be utilized to generate CAM instructions for generating a duplicate part from a workpiece, such as a blank, unbent object, etc. For example, in some embodiments, the disclosed systems and methods can be adapted for performing tube bending to match existing tube bends and styles, adaptive die application, adaptive vacuum formation, adaptive mold formation, and/or any other duplicating manufacturing process.

In some embodiments, the CAM system 300 (or portions thereof) include a portable system configured to be positioned at a work site and/or at a work location. The portable system can be configured to apply one or more additive, subtractive, and/or hybrid manufacturing processes to an in-place workpiece and/or perform one or more additive, subtractive, and/or hybrid manufacturing processes on-location at a variable location. The portable CAM system 300 can include one or more anchors, orientation marking, orientation mechanisms, and/or any other suitable modifications configured to allow locating and operation of the CAM system 300 at a variable location.

In some embodiments, the CAM system 300 includes one or more components, such as a CAM manufacturing system 302, located remotely from one or more other components, such as an associated computing device 306. The remotely located computing device 306 may be configured to remotely control operation of the CAM manufacturing system 302. For example, a computing device 306 located at a first location may be configured to generate CAD models and/or CAM toolpaths (for example according to the method 200 discussed below) for operation of a CAM manufacturing system 302 located at a second location. The computing device 306 may remotely operate the CAM manufacturing system 302, for example, by transmitting one or more control signals to and/or receiving one or more feedback signals from the CAM manufacturing system 302.

The disclosed systems and methods may be configured to allow "lights-out" operation of the CAM manufacturing system 302, e.g., operation of the CAM manufacturing system 302 from a location remote to the computing device 306 such that an individual operating the CAM manufacturing system 302 is not able to visually observe and/or verify operation of the CAM manufacturing system 302. In such embodiments, feedback regarding operation of the remotely located CAM manufacturing system 302 may be obtained solely through feedback signals provided to the computing device 306 from the remotely located CAM manufacturing system 302, such as image data obtained from an integrated scanner 304 as discussed in greater detail below.

FIGS. 1A-1G are a flowchart illustrating a method 200 of integrated generation of CAD bounding boxes and CAM toolpaths, in accordance with some embodiments. The disclosed method 200 can be configured to generate CAD models, CAD bounding boxes, CAM models, CAM toolpaths, CAM instructions, CNN instructions, and/or any other suitable data configured to control operation of a CAM system 300 and/or any component thereof. At step 202, a workpiece is secured within a working area 308 of a CAM manufacturing system 302. The workpiece can be secured using any suitable process, such as, for example, clamping, vacuum systems, magnetic systems, etc. In some embodiments, the CAM system 300 includes a portable system that can be positioned at a work site and configured to perform repair, additive manufacturing, subtractive manufacturing, hybrid manufacturing, improvement of mass conditions, and/or other manufacturing operations on-location and/or as applied to a fixed worksite.

At step 204, an integrated scanning method 400 (also referred to as an integrated scanning process) is implemented. Although embodiments are illustrated herein including the integrated scanning method 400 as a sub-method of the method 200, it will be appreciated that the integrated scanning method 400 can be implemented independently of the method 200 in some embodiments. At initial step 402, an integrated scanner 304 is initialized and, at step 404, a determination is made whether parameters for the integrated scanner 304 have been previously determined and stored in a storage mechanism, such as a database. If the parameters have been previously determined, the method proceeds to step 406 and the parameters for the integrated scanner are obtained from the storage mechanism. If the parameters for the integrated scanner 304 have not been previously determined and/or need to be re-determined (e.g., due to change in the system, corruption of the prior data, etc.), the method 200 proceeds to step 408.

At step 408, one or more scanner parameters 450 are received or input. The scanner parameters 450 can include, but are not limited to, a scanner type 452, scanner requirements 454, process environment specifications 456, focal length 458, image capture specifications 460, dynamically workpiece scanning parameters 462 (e.g., parameters for scanning a dynamically moving workpiece utilizing a fixed integrated scanner 104), fixed workpiece scanning parameters 464 (e.g., parameters for scanning a fixed workpiece utilizing a dynamically moving integrated scanner), etc. In some embodiments, the scanner parameters 450 include one or more defined application programming interfaces (APIs) 470 for coupling the integrated scanner 304 and/or processes utilizing the integrated scanner 304 to additional components of the CAM system 300. At step 410, the received scanner parameters 450 are stored in a storage mechanism, such as a database.

After obtaining the parameters for the integrated scanner 304, whether at step 406 or steps 408-410, the integrated scanning method 400 proceeds to step 412 and configures scan-specific controls 480 for the integrated scanner 304. In some embodiments, scan-specific controls 480 define parameters for scanning of a workpiece that can vary from scan to scan, such as, for example, lighting parameters 482, material reflectivity parameters 484 for the workpiece, scan-specific scanner settings 486, object location and/or object orientation parameters 488 (e.g., scan data corresponding to a location of the scanned object in relation to system parameters), object reflectivity parameters 490 defining reflectivity for one or more objects in the working area 308, etc. It will be appreciated that any suitable scan-specific controls 480 can be defined and/or received for each scan. In some embodiments, if a scan-specific control 480 is not received, the integrated scanner 304 and/or the computing device 306 can provide a default value.

At step 414, a scan is performed. The scan can be performed utilizing any suitable scanning capability of the integrated scanner 304. For example, as discussed above, the integrated scanner 304 can include a contact and/or non-contact scanning mechanism configured to obtain surface and/or sub-surface image data. For example, in some embodiments, the integrated scanner 304 includes a dynamic (i.e., movable) scanning element configured to move within the working area 308. As another example, in some embodiments, the integrated scanner 304 includes a stationary scanning element that is configured to obtain scan data for one or more stationary and/or dynamic (i.e., moving) targets within a working area 308. Although specific embodiments are discussed herein, it will be appreciated that scan data can be obtained utilizing any suitable scanning mechanism and/or scanning process.

In some embodiments, the integrated scanner 304 can be configured to obtain scan data of a workpiece positioned within a working area 308 of the CAM manufacturing system 302, a landscape of a work area within the CAM manufacturing system 302, parts and/or components of the CAM manufacturing system 302, tools 312 and/or tool holders 314 of the CAM manufacturing system 302, and/or any other suitable elements, components, materials, etc. The scan data can be obtained with respect to a starting point and/or with respect to a predefined coordinate grid. Scan data can be obtained in any suitable format, such as, for example, point cloud data. It will be appreciated that obtained scan data can be converted into any suitable format required by any processing steps, such as processing steps of method 200 and/or processing steps of the integrated scanning method 400. In some embodiments, orientation between scan data and system functionality (controlled motion capabilities) is required. Orientation can be provided manually and/or, preferably, by an automated process, to promote the success of rapid material processing. In some embodiments, orientation can include automatic and/or manual correction of scan data, generated CAD data, and/or a physical position of a workpiece to provide efficient system processing (i.e., XYZ system motion and functions) and/or to eliminate errors between generated models and physical workpieces or objects.

At step 416, scan data generated by the scan at step 414 can be evaluated, for example, by the computing device 306, a processor integrally formed with the integrated scanner 304, and/or any other suitable processing element. Evaluation of the scan data can include, but is not limited to, a determination that a scan completed successfully, a determination that a scan obtained scan data of suitable quality or granularity, a determination that the scan included one or more expected structures, and/or any other suitable determination or evaluation. At step 418, a determination is made whether the evaluation indicates a successful scan or a failed scan. If the scan was successful, the integrated scanning method 400 completes and the method 200 proceeds to step 206. However, if scan failed or did not provide adequate scan data, the integrated scanning method 400 proceeds to step 420.

At step 420, a determination is made whether a predetermined number (e.g. a threshold value) of scans has been exceeded. For example, the integrated scanner 304 and/or the computing device 306 can increment a current scan value for each subsequent scan performed during a specific scanning process. If the threshold value has not been exceeded, the integrated scanning method 400 proceeds to step 422 and the prior scan is evaluated to identify the cause of the failure. For example, the scan data and/or additional data regarding the integrated scanner 304 and/or the CAM manufacturing system 302 can be evaluated to determine a cause of failure. For example, in some embodiments, a scan failure can occur due to data failure (e.g., corrupted data, unreceived data, etc.) and/or a process failure (e.g., an integrated scanner 304 error, a working arm 310 error, etc.). At step 424, a determination is made regarding the cause of the scan failure. If the failure was a data failure, the integrated scanning method 400 proceeds to step 426 and applies one or more data mending processes to the received scan data and returns to step 416 for further scan data evaluation. If the failure is determined to be a process failure, the integrated scanning method 400 returns to step 412 and the scan-specific controls 480 are modified based on the evaluation. If, at step 222, the threshold value of scans is exceeded, the integrated scanning method 400 proceeds to step 428, the integrated scanning method 400 is aborted, and troubleshooting of the CAM system 300, such as the integrated scanner 304, is performed.

In some embodiments, one or more steps of the integrated scanning method 400 can be performed by one or more trained artificial intelligence models. For example, in various embodiments, one or more of steps 404-412 and/or 416-426 can be implemented, partially and/or entirely, by one or more trained models. In some embodiments, the integrated scanning method 400 includes steps for obtaining and implementing a trained model to perform one or more of steps 404-412 and/or 416-426.

After successful completion of the integrated scanning method 400, for example, after a determination at step 418 that a scan was successful, the method 200 proceeds to step 206 and a CAD/CAM data generation method 500 is implemented. Although embodiments are illustrated herein including the CAD/CAM data generation method 500 as a sub-method of the method 200, it will be appreciated that the CAD/CAM data generation method 500 can be implemented independently of the method 200 in some embodiments. At step 502, the scan data is imported into a digital workspace. The digital workplace can be implemented by any suitable system, such as, for example, the associated computing device 306, in conjunction with one or more software programs, such as an integrated CAD/CAM program. At step 504, the imported scan data is located and/or placed within the digital workplace at a digital location corresponding to the physical location of the workpiece within the working area 308 of the CAM manufacturing system 302.

At step 506, digital CAD models and/or toolpaths are generated. For example, in some embodiments, it is determined at step 506 that a CAD model or a tool model is required (e.g., a CAD model of the scanned workpiece). The CAD/CAM data generation method 500 proceeds to step 508 and determines whether the required CAD and/or tool model is available in a database. If each of the required models are in a database, the CAD/CAM data generation method 500 proceeds to step 510. However, if a required model is not in the database, the CAD/CAM data generation method 500 proceeds to step 512.

At step 512, the CAD/CAM data generation method 500 implements a model generation sub-process 600 to generate a corresponding CAD or tool model. In some embodiments, at step 602, the model generation sub-process 600 acquires scan data for a target object and/or tool. For example, if a CAD model is required for a target material (e.g., raw material, scrap material, partially formed part, etc.), the previously obtained scan data of the target material within the CAM manufacturing system 102 can be obtained. Scan data can be obtained according to the integrated scanning method 400 discussed above. At step 604, the scan data is saved and, at step 606, imported to one or more applicable software programs configured to implement at least a portion of the model generation sub-process 600, such as, for example, one or more CAD/CAM generation programs implemented by the associated computing device 306. At step 608, the scan data is positioned within an applicable portion of a digital workspace to generate a model. After generating an initial model, at step 610, the model generation sub-process 600 determines if knitting of the model is necessary and, if necessary, at step 612, knits one or more initial models to generate a final CAD model or tool model. After completion of the model generation sub-process 600, at step 528, the generated model(s) are stored in a database and the CAD/CAM data generation method 500 returns to step 508 to determine if additional models are necessary.

The model generation sub-process 600 utilizes the previously obtained scan data, which is oriented in a coordinate grid or space corresponding to the working area 308 of the CAM manufacturing system 302. As a result, models generated by the model generation sub-process 600 are oriented in a model space that corresponds to the orientation and/or coordinate grid of the working area 308. The model generation sub-process 600 can be implemented to identify any scanned object within the scan data, such as, for example, existing features of a workpiece, work holding elements, fixtures, potential crashes, tools, etc.

The model generation sub-process 600 allows for modeling of heterogeneous or irregular surfaces. For example, the model generation sub-process 600 allows for generation of models corresponding to irregular materials, scrap materials, materials having existing manufactured elements, materials having predetermined orientations, etc. By generating accurate models of real-world objects, the model generation sub-process 600 enables subtractive and additive manufacturing processes to be performed using irregular materials, such as irregular surfaces, scrap materials, etc., while providing high accuracy for manufactured parts or products. For example, in various embodiments, a model of an irregular and/or regular service can provide high accuracy for mechanical bonding operations (e.g., texturing, scoring, etching, texture growth, etc.), electrical bonding operations (e.g., work surface temperature control, identification of touch and non-touch points, etc.), chemical bonding operations (e.g., priming and bonding application), etc.

In some embodiments, one or more steps of the model generation sub-process 600 can be performed by one or more trained artificial intelligence models. For example, in various embodiments, one or more of steps 602-612 can be performed by one or more trained models. In some embodiments, the model generation sub-process 600 includes steps for obtaining and implementing a trained model to perform one or more of steps 602-612.

When the determination at step 508 determines that all necessary models are in a database, the CAD/CAM data generation method 500 proceeds to step 510 and determines if setup parameters for the selected CAD model and tool models are included in the database. Setup parameters can include bounding boxes for CAD models and/or tool models, selection process parameters, material parameters, operational parameters, etc. If the setup parameters are available, the CAD/CAM data generation method 500 proceeds to step 514. If the setup parameters are not available, the CAD/CAM data generation method 500 proceeds to step 516.

At step 516, the CAD/CAM data generation method 500 generates an initial setup for the associated CAD model and tools. At step 518, the generated CAD data (e.g., the CAD models or tool models generated and/or obtained from the database at steps 506-508) is positioned or located within a digital workspace and, at step 520, one or more bounding boxes can be defined for the applicable models. It will be appreciated that traditional bounding boxes and/or irregular bounding boxes can be defined in conjunction and/or based on the scan data obtained during the integrated scanning method 400. At step 522, the relationship the bounding boxes and the CAD model(s) in a defined coordinate system (e.g., a world coordinate system (WCS)).

At step 524, setup parameters for a process are defined for operation of one or more tools to generate a target part based on the defined bounding boxes. In some embodiments, the process relates to an automated process selection performed by the CAM manufacturing system 302 based on received processing instructions. At step 526, the generated setup parameters are saved to a database.

In some embodiments, the generated setup parameters can include one or more secondary support parameters. For example, in some embodiments, the generated setup parameters can include parameters regarding design and/or fabrication of necessary support structures, heat sinks, and/or other secondary features that may be necessary during manufacturing of a part or product but are not included in or on a finished part or product. In some embodiments, the generated setup parameters include parameters regarding support or reinforcement of surfaces for one or more manufacturing processes, such as a melding process that can exert thousands of pounds of force onto a workpiece or surface. The CAD/CAM data generation method 500 can be configured to generate parameters corresponding to support structures necessary to perform the one or more manufacturing processes.

In some embodiments, one or more steps of the CAD/CAM data generation method 500 can be performed by one or more trained artificial intelligence models. For example, in various embodiments, one or more of steps 502-528 can be performed by one or more trained models. In some embodiments, the CAD/CAM data generation method 500 includes steps for obtaining and implementing a trained model to perform one or more of steps 502-528.

In some embodiments, the CAD/CAM data generation method 500 is configured to generate control data applicable to each axis of control provided by a corresponding CAM manufacturing system, such as CAM manufacturing system 302. For example, in some embodiments, the CAD/CAM data generation method 500 may be configured to generate CAD models and/or CAM tool paths incorporating and/or optimized for a set of operational axes provided by a corresponding CAM manufacturing system, such as, for example, three-axes, four-axes, etc. In some embodiments, the CAD/CAM data generation method 500 may be configured to utilize fixture libraries including data defining work holding fixtures for a selected number of axes and/or defined for use with the associated CAM manufacturing system. The CAD/CAM data generation method 500 may be configured to incorporate system-specific models and/or tools paths optimized for the system geometry (e.g., configured to avoid positioning in places that obstruct processing), system parameters (e.g., expected vibrations or environmental conditions), available mounting capabilities (e.g., compatible mounting fixtures), and/or any other system-specific parameters.

In some embodiments, the CAD models and/or the CAM tool paths generated by the CAD/CAM data generation method 500 may incorporate temporary structures configured to be modified and/or removed during and/or after a CAM manufacturing process. For example, in some embodiments, the CAD models and/or the CAM tool paths may be configured to generate temporary support structures to allow for the manufacture of other components and/or features. In some embodiments, the CAD/CAM data generation method 500 may include generation of CAM tool paths configured to remove and/or modify temporary structures during a CAM manufacturing process. In some embodiments, removal of temporary structures may be performed as a subsequent CAM manufacturing process including generation of a second set of CAD/CAM data after an initial manufacturing process including the temporary support structures is completed.

After obtaining setup parameters, for example from the database and/or through an initial setup, a system specification is received at step 208. In some embodiments, the system specification defines system parameters of the CAM manufacturing system 302 to be used for generation of the target part. It will be appreciated that system specifications can include identification of a specific, commercially available system and/or define a system according to one or more capabilities or functionalities of the system. For example, in some embodiments, system specifications can include, but are not limited to, identification of the CAM manufacturing system 302 as an additive manufacturing system, a subtractive manufacturing system, or a hybrid manufacturing system. As another example, in some embodiments, the system specifications can include, but are not limited to, identification of a manufacturer and model of the CAM manufacturing system 302.

At step 210, the associated computing device 306 determines if system parameters for the identified system are stored in a database. If system parameters are stored in the database, the method 200 proceeds to step 212 and obtains the designated system parameters from the database. However, if system parameters are not stored in the database, the method 200 proceeds to step 214. At step 214, a set of system parameters is received. Entry of the set of system parameters can include an automated and/or manual process for obtaining system parameters for an identified CAM manufacturing system 302. For example, in various embodiments, defined system parameters can include, but are not limited to, designated system materials 702 (e.g., one or more materials that can be processed by the CAM manufacturing system 302), hardware capabilities 704, applicator style or dims specifications 706 for additive manufacturing, axis setup specifications 708 (e.g., number, style, degrees, direction, etc.), work area space 710, manufacturing tool parameters 712, process environment parameters 714, thermal controls 716 (e.g., build surface controls for additive manufacturing, coolant systems for subtractive manufacturing, etc.), support requirements 718 (e.g., tool pressure specifications for additive and/or subtractive manufacturing), system mounting requirements 720 (e.g., for mobile systems), etc. In some embodiments, the set of system parameters 700 can be obtained and/or entered via one or more open APIs 730. Although specific embodiments are discussed herein, it will be appreciated that any suitable system parameters can be defined and utilized by the method 200.

In some embodiments, the system parameter entry can include an automated or partially automated process during which the associated computing device 306 queries one or more additional sources, such as the CAM manufacturing system 302, remote databases, etc., to obtain one or more system parameters. In some embodiments, system parameter entry can include a manual or partially manual process in which system parameters are defined through user entry via one or more input devices. It will be appreciated that any suitable process can be applied to obtain system parameters. In some embodiments, determination of one or more parameters, such as system parameters 700, can be performed by one or more trained artificial intelligence models, such as one or more trained models as described herein.

In some embodiments, one or more system parameters may be received at and/or via the CAM system 302. For example, a CAM system 302 may include one or more interface elements (e.g., hardware interface, software interface, mixed hardware-software interface, etc.) configured to receive one or more parameters. The parameters may be entered at the CAM system 302 manually and/or automatically. In some embodiments, a first set of system parameters may be obtained from a data storage mechanism, such as a database, and a second set of system parameters may be obtained from the CAM system 302, for example, via manual entry and/or automatic retrieval.

At step 216, the generated system parameters are verified (e.g., checked) against physical parameters. The verification can include an automated verification process (e.g., operation of the CAM manufacturing system 302 by the associated computing device 306 to confirm expected operational results and/or conditions) and/or can include a manual verification process. After the system parameters are verified, the system parameters are saved to the database at step 218.

After obtaining the system parameters, the method 200 proceeds to step 220 and designates one or more tool paths for operation of one or more tools by the CAM manufacturing system 302. At step 222, a determination is made whether tool path setup data has been previously generated and stored in a database for the designated tool path(s). If setup data has been previously generated, the method 200 proceeds to step 224 and obtains the tool and tool path setup data from the database and converts the tool and tool path setup data into machine-readable code configured for the CAM manufacturing system 302, such as, for example, G-Code. If setup data has not been previously generated, the method 200 proceeds to step 226 and implements a tool path creation process, such as an automated tool path creation process 800 and/or a manual tool path creation process 900. In some embodiments, the method 200 determines, at step 228, whether to implement the automated tool path creation process 800 or the manual tool path creation process 900.

In some embodiments, if automated tool path creation is selected at step 228, the method 200 implements the automated tool path creation process 800. Although embodiments are illustrated herein including the automated tool path creation process 800 as a sub-method of the method 200, it will be appreciated that the automated tool path creation process 800 can be implemented independently of the method 200 in some embodiments. At step 802, the computing device 306 automatically calculates tool paths and tool selections. In some embodiments, the computing device 306 includes one or more programs, such as a CAD-CAM conversion program, configured to provide one or more parameters for automatically calculating tool paths and tool selections. For example, in some embodiments, the CAD-CAM conversion program is configured to determine a difference (e.g., a delta) between a CAD model of a starting material (e.g., raw material, scrap material, etc.) and a target part and determine an optimal process for applying one or more tools to generate the target part, e.g., achieve the delta. The CAD-CAM conversion program can be configured to received tool models, CAD setup parameters, CAM setup parameters, and/or additional system parameters and utilize the received data to determine an optimal tool process for applying one or more tools. In some embodiments, the tool path and/or tool selections are converted into computer-readable instructions for operation of a CAM manufacturing system 302.

After generating a set of tool paths and tool selections (e.g., an initial set at step 802), the automated tool path creation process 800 determines, at step 804, if a predetermined number of simulations has been previously performed. If the predetermined number of simulations has not yet been met, the automated tool path creation process 800 proceeds to step 806 and performs a simulation (e.g., a computer-implemented simulation) of application of the generated tool paths and tool selections. The simulation is configured to generate a digital model of the starting material (e.g., raw material, scrap material, etc.) and apply the instructions to generate a digital model of a target part.

At step 808, the results of the simulation (e.g., the generated digital model of the target part) are evaluated to determine if the simulation, and by extension the selected tool paths and tool selections, produced an acceptable result. If the results are acceptable, the automated tool path creation process 800 proceeds to step 810 and the instructions are saved to a database. At step 812, the computer-readable code is converted into CAM manufacturing system 302 code, e.g., G-Code, and output to the CAM manufacturing system 302 (as discussed below with respect to step 230).

If, at step 808, the results of the simulation are determined to be unacceptable, the automated tool path creation process 800 proceeds to step 814 and evaluates the failed simulation. The evaluation can include, but is not limited to, evaluation of tool definitions or identifications 852, tool paths 854, address interference(s) 856, optimized run times 858, surface finish parameters 860, CAD/scan data 862, speed and feed parameters 864 for subtractive manufacturing, and fill type parameters 866 for additive manufacturing. At step 816, the automated tool path creation process 800 performs mending and/or optimization of the defined tool paths and tool selections based on the analysis at step 814. The automated tool path creation process 800 returns to step 804 to determine if the predetermined number of simulations has been met or exceeded and, if not, iteratively simulates and updates the tool path and tool selections until the simulation produces an acceptable result.

If the predetermined number of simulations has been met or exceed at step 804, the automated tool path creation process 800 is aborted at step 818. If the automated tool path creation process 800 is aborted, the method 200 can implement a manual tool path creation process 900 and/or generate an error indicating failure to create a tool path and requiring additional troubleshooting.

In some embodiments, one or more steps of the automated tool path creation process 800 can be performed by one or more trained artificial intelligence models. For example, in various embodiments, one or more of steps 802-812 can be performed by one or more trained models. In some embodiments, the automated tool path creation process 800 includes steps for obtaining and implementing a trained model to perform one or more of steps 802-812.

In some embodiments, if manual tool path creation is selected at step 228, the method 200 implements the manual tool path creation process 900. At step 902, the computing device 306 receives one or more inputs defining operation of a CAM manufacturing system 302 and/or other portions of an integrated CAM system 300. For example, in some embodiments, the defined inputs can include, but are not limited to, tool definitions or identifications 952, tool paths 954, address interference(s) 956, optimized run times 958, surface finish parameters 960, CAD/scan data 962, speed and feed parameters 964 for subtractive manufacturing, and fill type parameters 966 for additive manufacturing. At step 904, a CAM manufacturing system 302 operation is selected for the defined inputs and computer-readable instructions are generated for performing the selected operation.

After receiving the inputs and operation selection, the manual tool path creation process 900 determines, at step 906, if a predetermined number of simulations has been previously performed. If the predetermined number of simulations has not yet been met, the manual tool path creation process 900 proceeds to step 908 and performs a simulation (e.g., a computer-implemented simulation) of application of the generated tool paths and tool selections. The simulation is configured to generate a digital model of the starting material (e.g., raw material, scrap material, etc.) and apply the instructions to generate a digital model of a target part.

At step 910, the results of the simulation (e.g., the generated digital model of the target part) are evaluated to determine if the simulation, and by extension the selected tool paths and tool selections, produced an acceptable result. If the results are acceptable, the manual tool path creation process 900 proceeds to step 912 and the instructions are saved to a database. At step 914, the computer-readable code is converted into CAM manufacturing system 302 code, e.g., G-Code, and output to the CAM manufacturing system 302 (as discussed below with respect to step 266).

If, at step 910, the results of the simulation are determined to be unacceptable, the manual tool path creation process 900 proceeds to step 916. At step 916, the defined tool paths and/or tool selections can be mended and/or optimized, for example, by modifying one or more of the inputs received at step 902 defining operation of the CAM manufacturing system 302. The manual tool path creation process 900 returns to step 906 to determine if the predetermined number of simulations has been met or exceeded and, if not, iteratively simulates and updates the tool path and tool selections until the simulation produces an acceptable result.

If the predetermined number of simulations has been met or exceed at step 906, the manual tool path creation process 900 is aborted at step 918. If the manual tool path creation process 900 is aborted, the method 200 can implement an automated tool path creation process 800 and/or generate an error indicating failure to create a tool path and requiring additional troubleshooting. In some embodiments, the manual tool path creation process 900 implements one or more APIs 920 for receiving inputs (e.g., inputs defining operation of the CAM manufacturing system 302) and/or for providing outputs (e.g., results of evaluations).

In some embodiments, one or more steps of the manual tool path creation process 900 can be performed by one or more trained artificial intelligence models. For example, in various embodiments, one or more of steps 906-910 can be performed by one or more trained models. In some embodiments, the manual tool path creation process 900 includes steps for obtaining and implementing a trained model to perform one or more of steps 906-910.

It will be appreciated that the integrated scanning method 400 and the CAD/CAM data generation method 500 discussed above allow generation of tool paths that accommodate existing objects within a working area 308. For example, if the scan data obtained during a scan indicates one or more other objects, such as support or holding structures, the CAD/CAM data generation method 500 can include CAD models corresponding to those structures in the digital work area, allowing tool paths to be generated that avoid and/or take into account the presence of such structures.

After obtaining and/or generating the machine-readable code for operation of the CAM manufacturing system 302 (e.g., G-Code), the method 200 proceeds to step 230 and loads the machine-readable code into the CAM manufacturing system 302. At step 232, the CAM manufacturing system 302 designates program parameters, such as, for example, a lot size or inspection rate. At step 234, the program is executed by the CAM manufacturing system 302, which performs additive and/or subtractive manufacturing according to the previously generated tool selection and tool path setup parameters.

After completing the program, the method 200 proceeds to step 236. At step 236, the integrated scanner 304 is operated to obtain scan data of a processed material (e.g., a manufactured part or product, a partially manufactured part or product, etc.). The scan data can be obtained according to any suitable process or method, such as, for example, the integrated scanning method 400 discussed above. After obtaining the scan data, the method 200 implements a processed material evaluation process 1000. The processed material evaluation process 1000 is configured to scan the processed material, e.g., the manufactured part or product, and verify proper manufacturing of the part or product.

At step 1002, the processed material is evaluated with respect to the CAD data for the target part or product. In some embodiments, the scan data of the processed material is converted into a CAD model, for example, as discussed above with respect to CAD/CAM data generation method 500 and/or model generation sub-process 600 discussed above. The generated CAD model of the processed material is compared to the CAD model of the target part to determine if the processed material is within one or more predefined manufacturing tolerances. At step 1004, a determination is made whether the processed material passes or fails the evaluation. If the processed material passes the evaluation, the processed material evaluation process 1000 proceeds to step 1006 and the manufactured part can be certified as being within the defined tolerances. In some embodiments, if additional processing is required, the certification process can be skipped until subsequent processing has been performed. It will be appreciated that in-place evaluation of the processed material can eliminate the need to move a workpiece to a separate evaluation machine or space, such as a separate coordinate measuring machine (CMM), allowing for processed materials to be certified in place and enabling additional processing if necessary.

In some embodiments, a certification method may be modified and/or omitted when evaluating materials with internal stresses. For example, some materials can relax after being processed, such as through an accelerated relaxation process applying heat (e.g., an oven bake) and gradual cooling back down to room temperature. In some instances in which a processed material is suspected to have or has internal stresses, the disclosed "in-place" evaluation may result in a false positive certification. Additional dimensional analysis can be performed after the target object/processed material is in a relaxed state. In some embodiment, the additional dimension analysis requires breaking setup and implementing additional process throughput.

If the processed part fails the evaluation, the processed material evaluation process 1000 proceeds to step 1008. At step 1008, a determination is made regarding the reason for the evaluation failure. If the processed material is determined to be oversized, the method 200 can return to implement the CAD/CAM data generation method 500 based on the scan data of the processed material. The method 200 can generate additional tool paths and perform additional processing for removal of the excess material, as discussed above. If the processed material is undersized, the processed material evaluation process 1000 proceeds to step 1010 and a determination is made whether the processed material is a match to an additive material used in other manufacturing processes. If the processed material matches an additive material, the material can be salvaged at step 1012 and utilized in future manufacturing processes, for example, as an initial material provided to a CAM manufacturing system at step 208. If the processed material does not match an additive material, the processed material can be recycled at step 1014, saved for use in a future project at step 1016, and/or designated as scrap material at step 1018.

If the processed material passes the evaluation and is certified at step 1006, the processed material evaluation process 1000 proceeds to step 1020 and a determination is made whether additional processing is required of the processed material for the current CAM manufacturing system 302 setup. For example, in various embodiments, additional materials may be added to the processed material, secondary features can be manufactured, etc. If additional processing is required, the method 200 can return to step 220 and import scan data of the processed material as scan data of an initial material. Processing instructions for the additional processing can be generated according to the method 200 beginning at step 220, as discussed above. The disclosed systems and methods, such as method 200, provide extension of existing and/or added processing capabilities, such as additive manufacturing, subtractive manufacturing, and/or hybrid manufacturing.

In some embodiments, additional processing may include sub-processing, intermediate processing, and/or other processing operations. For example, a first processing operation, such as an additive processing operation, may include two or more partial manufacturing processes with additional manufacturing processes included between each of the partial manufacturing processes. A workpiece may be manufactured to a first partial structure and the first processing operation paused. A second processing operation, such as a second additive manufacturing process, a subtractive manufacturing process, a pick-and-place process, an incorporation process, etc. may be implemented on and/or in conjunction with the first partial structure. The second manufacturing process may include a material change, generation of in-process assemblies, etc. In some embodiments, the second manufacturing process is configured to manufacture and/or position materials and/or components at target locations that are accessible with respect to the first partial structure but inaccessible with respect to a finished structure.

In some embodiments, after the second manufacturing process is completed, the first manufacturing process may be resumed and/or continued to continue manufacturing of the first partial structure. A processed material evaluation process 1000 may be performed on the first partial structure prior to resuming the first manufacturing process. In some embodiments, a manufacturing process may include a multi-step manufacturing process, such as a hybrid manufacturing process, including multiple sub-manufacturing processes. Each of the sub-manufacturing processes may include partial and/or interruptible manufacturing processes that may be paused and/or partially completed to allow for additional manufacturing processes or steps to be performed intermittently with one or more other manufacturing processes.

In some embodiments, a hybrid and/or multi-step manufacturing process may utilize multiple iterations of the method 200 and/or steps thereof to generate multiple CAD models (and associated bounding boxes) and/or CAM toolpaths for each of the sub-manufacturing processes of the multi-step manufacturing process. For example, in some embodiments, a first iteration of method 200 may be configured to manufacture a first partial workpiece, a second iteration of method 200 may be configured to manufacture a second partial workpiece from and/or integrating the first partial workpiece, and a third iteration of method 200 may be configured to manufacture a final workpiece from the second partial workpiece. As another example, in some embodiments, a first iteration of method 200 may be configured to manufacture a final workpiece and may include one or more interruption or pause points, during which the first iteration of method 200 is paused and one or more additional iterations of method 200 (or portions thereof) are implemented to perform one or more sub-manufacturing, after which the first iteration of method 200 may be resumed to complete manufacture of the final workpiece. Although specific embodiments are discussed herein, it will be appreciated that any suitable combination of manufacturing operations and/or partial manufacturing operations may be utilized to perform manufacturing processes to complete a final workpiece.

In some embodiments, a multi-step manufacturing process includes a step-wise manufacturing process. A step-wise manufacturing process may include a plurality of first sub-manufacturing processes such as additive manufacturing, subtractive manufacture, hybrid manufacturing, etc., and a plurality of second sub-manufacturing processes, such as material placement processes, additional material deposition processes, surface treatment processes, pick-and-place processes, joining processes, etc. The plurality of first sub-manufacturing processes and secondary sub-manufacturing processes may be interspersed. For example, a first submanufacturing process, such as an additive manufacturing process, may be initially performed, a second sub-manufacturing process may be performed to deposit one or more materials within a portion of a partially manufactured workpiece, and a subsequent first sub-manufacturing process may be initiated to complete and/or further modify the partial workpiece. The second sub-manufacturing processes may include, but are not limited to, material placement processes, electrical placement and/or connection processes, mechanical placement and/or joining processes, etc.

If no additional processing is required by the current setup, the processed material evaluation process 1000 proceeds to step 1022 and completes (e.g., breaks) the previously defined setup. A determination is made at step 1024 as to whether the part or product is complete. If the part or product is complete, the manufactured part or product is removed from the CAM manufacturing system 302 at step 1026 and the method 200 returns to step 202 for manufacture of additional parts. If the part or product is not complete, the method 200 generates subsequent setups at step 1028, for example, beginning at one or more of step 202, step 204, and/or step 206.

In some embodiments, the processed material evaluation process 1000 can be configured to perform tool verification for one or more tools 312 included in the CAM manufacturing system 102. Scan data can be obtained for one or more tools, for example, according to the integrated scanning method 400 discussed above. The obtained tool scan data can be provided as input to the processed material evaluation process 1000. A CAD model can be generated of the scanned tool at step 1002 and compared to a pre-used model of the tool, such as a model generated from a scan prior to the current manufacturing operation, a model generated from a scan of the obtained prior to initial use of the tool, a model generated based on tool specifications, etc. The comparison can be configured to identify tool wear, tool fluting profiles (e.g., clear or obstructed), cutting edge wear, nozzle obstruction, applicator obstruction, etc. If the tool fails the evaluation, the tool can be serviced and/or replaced prior to performing additional manufacturing processes with the tool. Embodiments including tool scanning and/or tool evaluation can provide for determination, tracking, and/or exploitation of tool compensation, tool life parameters, and/or performance.

In some embodiments, one or more steps of the processed material evaluation process 1000 can be performed by one or more trained artificial intelligence models. For example, in various embodiments, one or more of steps 1002-1028 can be performed by one or more trained models. In some embodiments, the processed material evaluation process 1000 includes steps for obtaining and implementing a trained model to perform one or more of steps 1002-1028.

In some embodiments, one or more steps and/or sub-methods of the method 200 of integrated generation of CAD bounding boxes and CAM toolpaths may be performed according to one or more predetermined manufacturing data structures. For example, in some embodiments, a predetermined manufacturing data structure may be obtained from a database. The predetermined manufacturing data structure may include data elements configured to facilitate and/or cause manufacture of a component and/or component modification by the CAM manufacturing system 302. In some embodiments, the predetermined manufacturing data structure may include one or more data elements defining and/or configured to modify an expected starting material, a CAD model, a CAM toolpath, and/or any other suitable parameter of a manufacturing process. In some embodiments, the method 200 may be automatically executed based on one or more parameters defined by a predetermined manufacturing data structure to generate a component and/or component modification.

Figure 5:
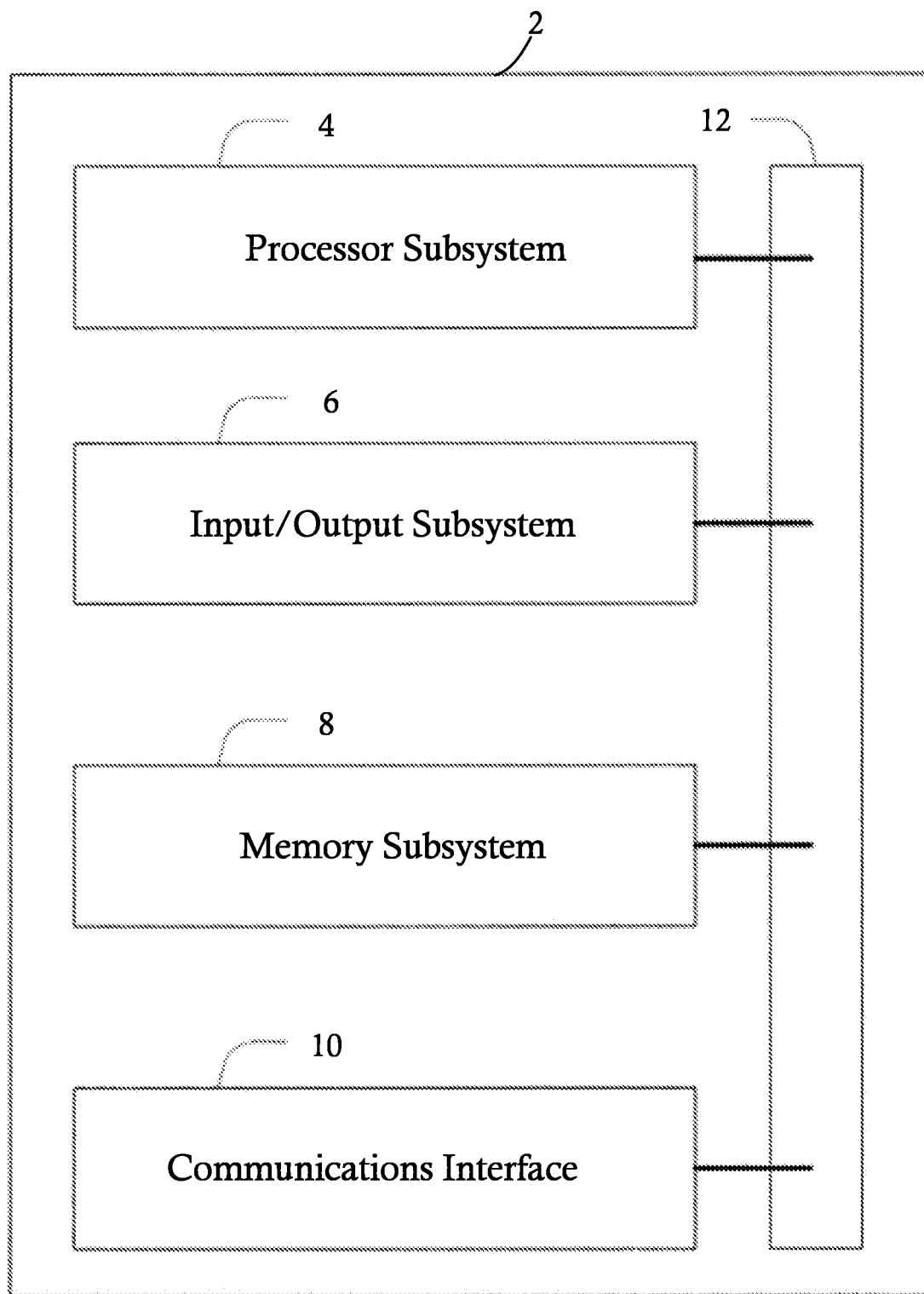
FIG. 5 illustrates a computer system configured to implement one or more processes, in accordance with some embodiments.

FIG. 5 illustrates a computer system configured to implement one or more processes, in accordance with some embodiments. The system 2 is a representative device and can include a processor subsystem 4, an input/output subsystem 6, a memory subsystem 8, a communications interface 10, and a system bus 12. In some embodiments, one or more than one of the system 2 components can be combined or omitted such as, for example, not including an input/output subsystem 6. In some embodiments, the system 2 can include other components not combined or comprised in those shown in FIG. 1. For example, the system 2 can also include, for example, a power subsystem. In other embodiments, the system 2 can include several instances of the components shown in FIG. 1. For example, the system 2 can include multiple memory subsystems 8. For the sake of conciseness and clarity, and not limitation, one of each of the components is shown in FIG. 1.

The processor subsystem 4 can include any processing circuitry operative to control the operations and performance of the system 2. In various aspects, the processor subsystem 4 can be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also can be implemented by a controller, a microcontroller, an application specific integrated circuit (ASIC), a field programmable gate array (FPGA), a programmable logic device (PLD), and so forth.

In various aspects, the processor subsystem 4 can be arranged to run an operating system (OS) and various applications. Examples of an OS comprise, for example, operating systems generally known under the trade name of Apple OS, Microsoft Windows OS, Android OS, Linux OS, and any other proprietary or open-source OS. Examples of applications comprise, for example, network applications, local applications, data input/output applications, user interaction applications, etc.

In some embodiments, the system 2 can include a system bus 12 that couples various system components including the processor subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCM-CIA), Small Computers Interface (SCSI) or other proprietary bus, or any custom bus suitable for computing device applications.

In some embodiments, the input/output subsystem 6 can include any suitable mechanism or component to enable a user to provide input to system 2 and the system 2 to provide output to the user. For example, the input/output subsystem 6 can include any suitable input mechanism, including but not limited to, a button, keypad, keyboard, click wheel, touch screen, motion sensor, microphone, camera, etc.

In some embodiments, the input/output subsystem 6 can include a visual peripheral output device for providing a display visible to the user. For example, the visual peripheral output device can include a screen such as, for example, a Liquid Crystal Display (LCD) screen. As another example, the visual peripheral output device can include a movable display or projecting system for providing a display of content on a surface remote from the system 2. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 4. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 can include any suitable hardware, software, or combination of hardware and software that is capable of coupling the system 2 to one or more networks and/or additional devices. The communications interface 10 can be arranged to operate with any suitable technique for controlling information signals using a desired set of communications protocols, services, or operating procedures. The communications interface 10 can include the appropriate physical connectors to connect with a corresponding communications medium, whether wired or wireless.

Vehicles of communication comprise a network. In various aspects, the network can include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules can communicate in accordance with a number of wired protocols. Examples of wired protocols can include Universal Serial Bus (USB) communication, RS-232, RS-422, RS-423, RS-485 serial protocols, Fire Wire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 can include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 can include a wireless interface comprising one or more antennas, transmitters, receivers, transceivers, amplifiers, filters, control logic, and so forth.

In various aspects, the communications interface 10 can provide data communications functionality in accordance with a number of protocols. Examples of protocols can include various wireless local area network (WLAN) protocols, including the Institute of Electrical and Electronics Engineers (IEEE) 802.xx series of protocols, such as IEEE 802.11a/b/g/n/ac/ax/be, IEEE 802.16, IEEE 802.20, and so forth. Other examples of wireless protocols can include various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, the Wi-Fi series of protocols including Wi-Fi Legacy, Wi-Fi 1/2/3/4/5/6/6E, and so forth. Further examples of wireless protocols can include wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols can include near-field communication techniques and protocols, such as electromagnetic induction (EMI) techniques. An example of EMI techniques can include passive or active radio-frequency identification (RFID) protocols and devices. Other suitable protocols can include Ultra-Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 can include any machine-readable or computer-readable media capable of storing data, including both volatile/non-volatile memory and removable/non-removable memory. The memory subsystem 8 can include at least one non-volatile memory unit. The non-volatile memory unit is capable of storing one or more software programs. The software programs can contain, for example, applications, user data, device data, and/or configuration data, or combinations therefore, to name only a few. The software programs can contain instructions executable by the various components of the system 2.

In various aspects, the memory subsystem 8 can include any machine-readable or computer-readable media capable of storing data, including both volatile/non-volatile memory and removable/non-removable memory. For example, memory can include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 can contain an instruction set, in the form of a file for executing various methods, such as methods for end-to-end simulation including hybrid input modeling, as described herein. The instruction set can be stored in any acceptable form of machine-readable instructions, including source code or various appropriate programming languages. Some examples of programming languages that can be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processor subsystem 4.

Figure 6:
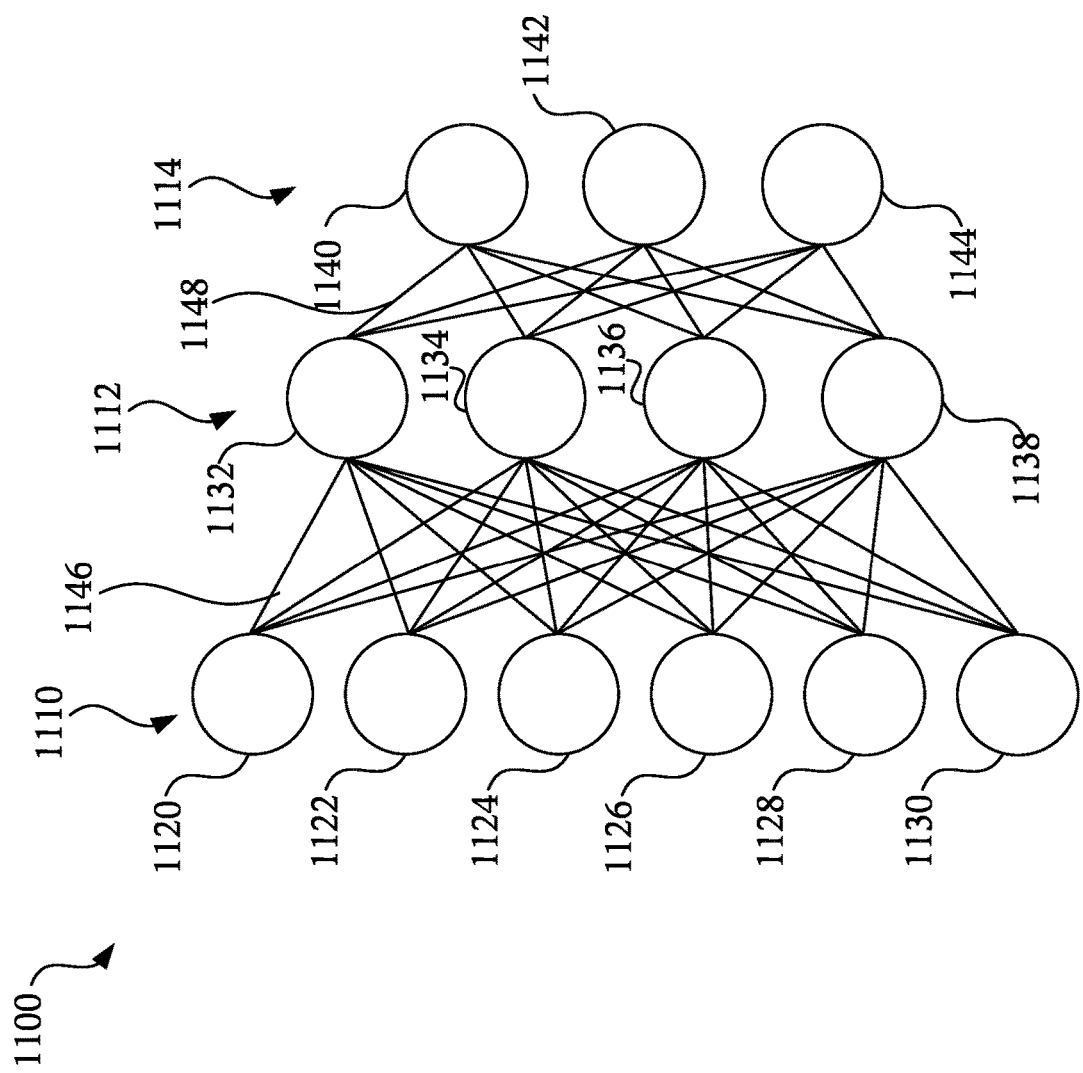
FIG. 6 illustrates an artificial neural network, in accordance with some embodiments.

FIG. 6 illustrates an artificial neural network 1100, in accordance with some embodiments. Alternative terms for "artificial neural network" are "neural network," "artificial neural net," "neural net," or "trained function." The neural network 1100 comprises nodes 1120-1144 and edges 1146-1148, wherein each edge 1146-1148 is a directed connection from a first node 1120-1138 to a second node 1132-1144. In general, the first node 1120-1138 and the second node 1132-1144 are different nodes, although it is also possible that the first node 1120-1138 and the second node 1132-1144 are identical. For example, in FIG. 6 the edge 1146 is a directed connection from the node 1120 to the node 1132, and the edge 1148 is a directed connection from the node 1132 to the node 1140. An edge 1146-1148 from a first node 1120-1138 to a second node 1132-1144 is also denoted as "ingoing edge" for the second node 1132-1144 and as "outgoing edge" for the first node 1120-1138.

The nodes 1120-1144 of the neural network 1100 can be arranged in layers 1110-1114, wherein the layers can comprise an intrinsic order introduced by the edges 1146-1148 between the nodes 1120-1144. In particular, edges 1146-1148 can exist only between neighboring layers of nodes. In the illustrated embodiment, there is an input layer 1110 comprising only nodes 1120-1130 without an incoming edge, an output layer 1114 comprising only nodes 1140-1144 without outgoing edges, and a hidden layer 1112 in-between the input layer 1110 and the output layer 1114. In general, the number of hidden layer 1112 can be chosen arbitrarily and/or through training. The number of nodes 1120-1130 within the input layer 1110 usually relates to the number of input values of the neural network, and the number of nodes 1140-1144 within the output layer 1114 usually relates to the number of output values of the neural network.

In particular, a (real) number can be assigned as a value to every node 1120-1144 of the neural network 1100. Here, $x_i^{(n)}$ denotes the value of the i-th node 1120-1144 of the n-th layer 1110-1114. The values of the nodes 1120-1130 of the input layer 1110 are equivalent to the input values of the neural network 1100, the values of the nodes 1140-1144 of the output layer 1114 are equivalent to the output value of the neural network 1100. Furthermore, each edge 1146-1148 can comprise a weight being a real number, in particular, the weight is a real number within the interval [−1, 1], within the interval [0, 1], and/or within any other suitable interval. Here, $w_{i,j}^{(m,n)}$ denotes the weight of the edge between the i-th node 1120-1138 of the m-th layer 1110, 1112 and the j-th node 1132-1144 of the n-th layer 1112, 1114. Furthermore, the abbreviation $w_{i,j}^{(n)}$ is defined for the weight $w_{i,j}^{(n,n+1)}$.

In particular, to calculate the output values of the neural network 1100, the input values are propagated through the neural network. In particular, the values of the nodes 1132-1144 of the (n+1)-th layer 1112, 1114 can be calculated based on the values of the nodes 1120-1138 of the n-th layer 1110, 1112 by $$x_j^{(n+1)} = f(\Sigma_i x_i^{(n)} \cdot w_{i,j}^{(n)})$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 1110 are given by the input of the neural network 1100, wherein values of the hidden layer(s) 1112 can be calculated based on the values of the input layer 1110 of the neural network and/or based on the values of a prior hidden layer, etc.

In order to set the values $w_{i,j}^{(m,n)}$ for the edges, the neural network 1100 has to be trained using training data. In particular, training data comprises training input data and training output data. For a training step, the neural network 1100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 1100 (backpropagation algorithm). In particular, the weights are changed according to $$w'_{i,j}{}^{(n)} = w_{i,j}^{(n)} - \gamma \cdot \delta_j^{(n)} \cdot x_i^{(n)}$$

wherein $\gamma$ is a learning rate, and the numbers $\delta_j^{(n)}$ can be recursively calculated as $$\delta_j^{(n)} = (\Sigma_k \delta_k^{(n+1)} \cdot w_{j,k}^{(n+1)}) \cdot f'(\Sigma_i x_i^{(n)} \cdot w_{i,j}^{(n)})$$

based on $\delta_j^{(n+1)}$, if the (n+1)-th layer is not the output layer, and $\delta_j^{(n)} = (x_k^{(n+1)} - t_j^{(n+1)}) \cdot f'(\Sigma_i x_i^{(n)} \cdot w_{i,j}^{(n)})$ if the (n+1)-th layer is the output layer 114, wherein f is the first derivative of the activation function, and $y_j^{(n+1)}$ is the comparison training value for the j-th node of the output layer 1114.

In some embodiments, the neural network 1100 is configured, or trained, to perform one or more of the disclosed methods. For example, a neural network 1100 can be configured to implement one or more steps of the method 200, including, but not limited to, one or more steps of the integrated scanning method 400, one or more steps of the CAD/CAM data generation method 500, one or more steps of the model generation sub-process 600, one or more steps of the automated tool path creation process 800, one or more steps of the manual tool path creation process 900 (e.g., simulation steps), and/or one or more steps of the processed material evaluation process 1000.

Figure 7:
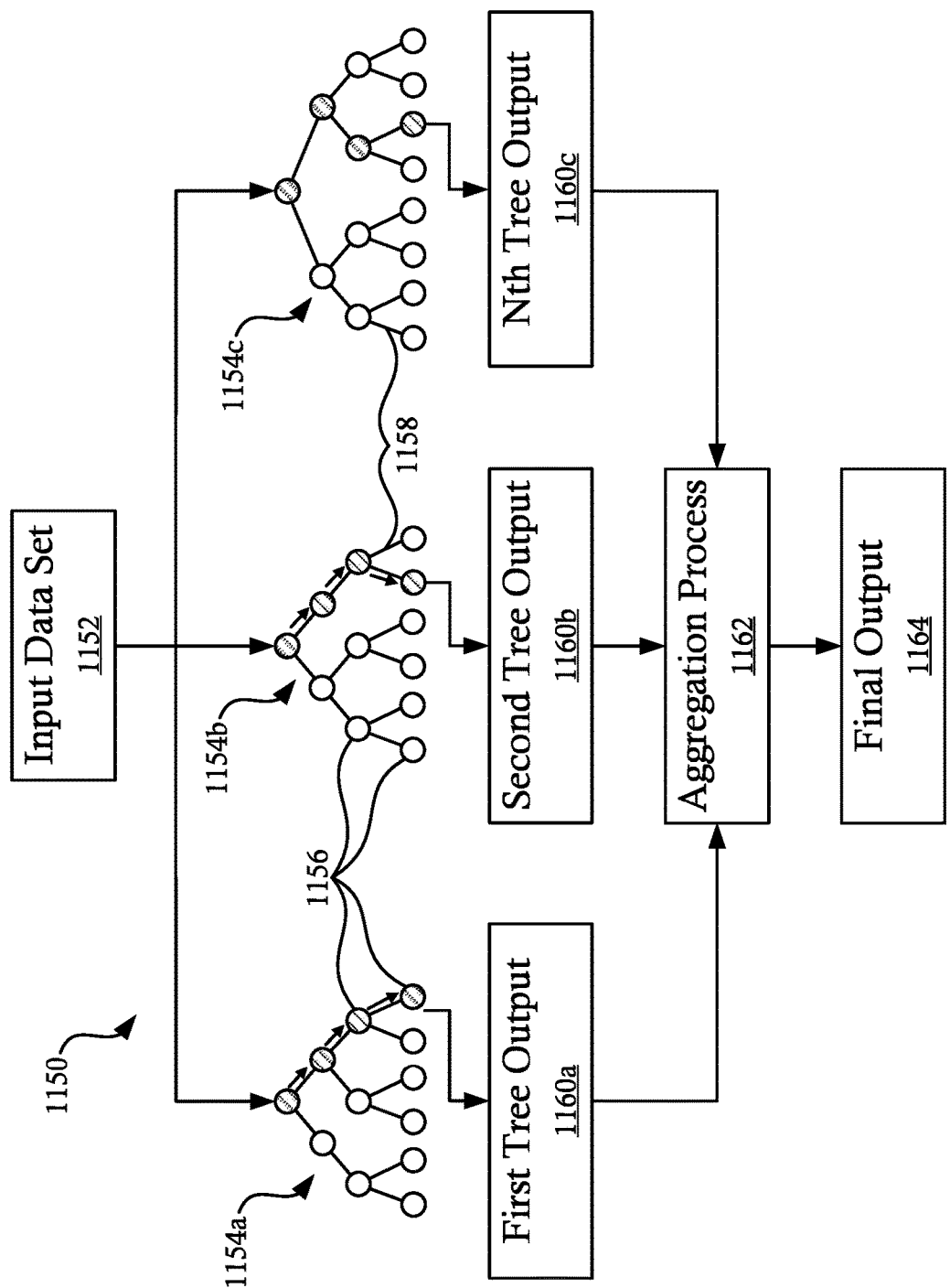
FIG. 7 illustrates a tree-based artificial neural network, in accordance with some embodiments.

FIG. 7 illustrates a tree-based neural network 1150, in accordance with some embodiments. In particular, the tree-based neural network 1150 is a random forest neural network, though it will be appreciated that the discussion herein is applicable to other decision tree neural networks. The tree-based neural network 1150 includes a plurality of trained decision trees 1154a-1154c each including a set of nodes 1156 (also referred to as "leaves") and a set of edges 1158 (also referred to as "branches").

Each of the trained decision trees 1154a-1154c can include a classification and/or a regression tree (CART). Classification trees include a tree model in which a target variable can take a discrete set of values, e.g., can be classified as one of a set of values. In classification trees, each leaf 1156 represents class labels and each of the branches 1158 represents conjunctions of features that connect the class labels. Regression trees include a tree model in which the target variable can take continuous values (e.g., a real number value).

In operation, an input data set 1152 including one or more features or attributes is received. A subset of the input data set 1152 is provided to each of the trained decision trees 1154a-1154c. The subset can include a portion of and/or all of the features or attributes included in the input data set 1152. Each of the trained decision trees 1154a-1154c is trained to receive the subset of the input data set 1152 and generate a tree output value 1160a-1160c, such as a classification or regression output. The individual tree output value 1160a-1160c is determined by traversing the trained decision trees 1154a-1154c to arrive at a final leaf (or node) 1156.

In some embodiments, the tree-based neural network 1150 applies an aggregation process 1162 to combine the output of each of the trained decision trees 1154a-1154c into a final output 1164. For example, in embodiments including classification trees, the tree-based neural network 1150 can apply a majority-voting process to identify a classification selected by the majority of the trained decision trees 1154a-1154c. As another example, in embodiments including regression trees, the tree-based neural network 1150 can apply an average, mean, and/or other mathematical process to generate a composite output of the trained decision trees. The final output 1164 is provided as an output of the tree-based neural network 1150.

In some embodiments, the tree-based neural network 1150 is configured, or trained, to perform one or more of the disclosed methods. For example, a tree-based neural network 1150 can be configured to implement one or more steps of the method 200, including, but not limited to, one or more steps of the integrated scanning method 400, one or more steps of the CAD/CAM data generation method 500, one or more steps of the model generation sub-process 600, one or more steps of the automated tool path creation process 800, one or more steps of the manual tool path creation process 900 (e.g., simulation steps), and/or one or more steps of the processed material evaluation process 1000.

Figure 8:
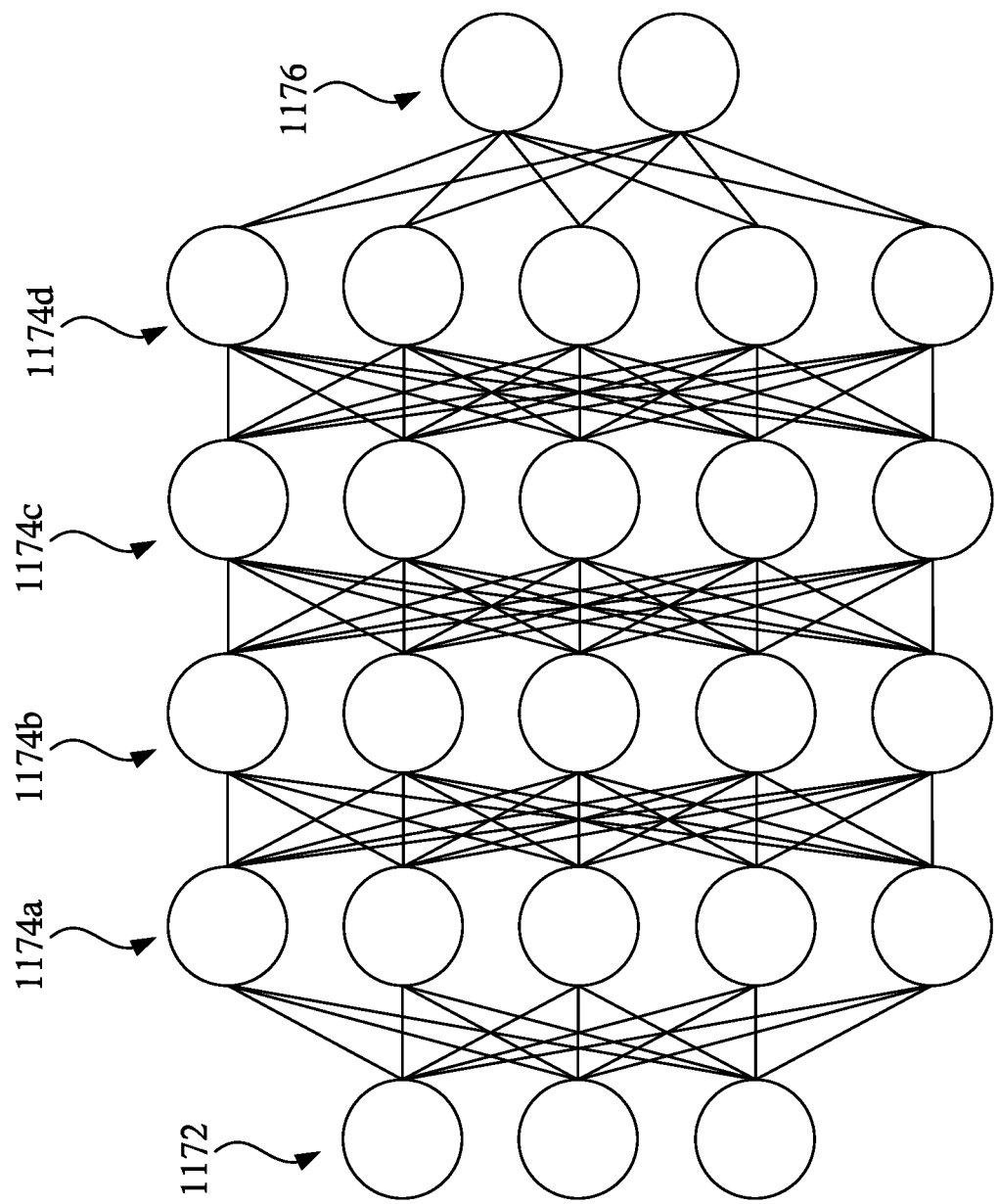
FIG. 8 illustrates a deep neural network (DNN), in accordance with some embodiments.

FIG. 8 illustrates a deep neural network (DNN) 1170, in accordance with some embodiments. The DNN 1170 is an artificial neural network, such as the neural network 1100 illustrated in conjunction with FIG. 6, that includes representation learning. The DNN 1170 can include an unbounded number of (e.g., two or more) intermediate layers 1174a-1174d each of a bounded size (e.g., having a predetermined number of nodes), providing for practical application and optimized implementation of a universal classifier. Each of the layers 1174a-1174d can be heterogenous. The DNN 1170 can is configured to model complex, non-linear relationships. Intermediate layers, such as intermediate layer 1174c, can provide compositions of features from lower layers, such as layers 1174a, 1174b, providing for modeling of complex data.

In some embodiments, the DNN 1170 can be considered a stacked neural network including multiple layers each configured to execute one or more computations. The computation for a network with L hidden layers can be denoted as:

$$f(x) = f\left[a^{(L+1)}\left(h^{(L)}\left(a^{(L)}\left(\ldots\left(h^{(2)}\left(a^{(2)}\left(h^{(1)}\left(a^{(1)}(x)\right)\right)\right)\right)\right)\right)\right)\right]$$

where $a^{(l)}(x)$ is a preactivation function and $h^{(l)}(x)$ is a hidden-layer activation function providing the output of each hidden layer. The preactivation function $a^{(l)}(x)$ can include a linear operation with matrix $W^{(l)}$ and bias $b^{(l)}$, where:

$$a^{(l)}(x) = W^{(l)}x + b^{(l)}$$

In some embodiments, the DNN 1170 is a feedforward network in which data flows from an input layer 1172 to an output layer 1176 without looping back through any layers. In some embodiments, the DNN 1170 can include a backpropagation network in which the output of at least one hidden layer is provided, e.g., propagated, to a prior hidden layer. The DNN 1170 can include any suitable neural network, such as a self-organizing neural network, a recurrent neural network, a convolutional neural network, a modular neural network, and/or any other suitable neural network.

In some embodiments, a DNN 1170 can include a neural additive model (NAM). An NAM includes a linear combination of networks, each of which attends to (e.g., provides a calculation regarding) a single input feature. For example, an NAM can be represented as:

$$y = \beta + f_1(x_1) + f_2(x_2) + \ldots + f_K(x_K)$$

where $\beta$ is an offset and each $f_i$ is parametrized by a neural network. In some embodiments, the DNN 1170 can include a neural multiplicative model (NMM), including a multiplicative form for the NAM mode using a log transformation of the dependent variable y and the independent variable x:

$$y = e^{\beta} e^{f(\log x)} e^{\Sigma_i f_i d}(d_i)$$

where d represents one or more features of the independent variable x.

In some embodiments, the DNN 1170 is configured, or trained, to perform one or more of the disclosed methods. For example, a DNN 1170 can be configured to implement one or more steps of the method 200, including, but not limited to, one or more steps of the integrated scanning method 400, one or more steps of the CAD/CAM data generation method 500, one or more steps of the model generation sub-process 600, one or more steps of the automated tool path creation process 800, one or more steps of the manual tool path creation process 900 (e.g., simulation steps), and/or one or more steps of the processed material evaluation process 1000.

Figure 9:
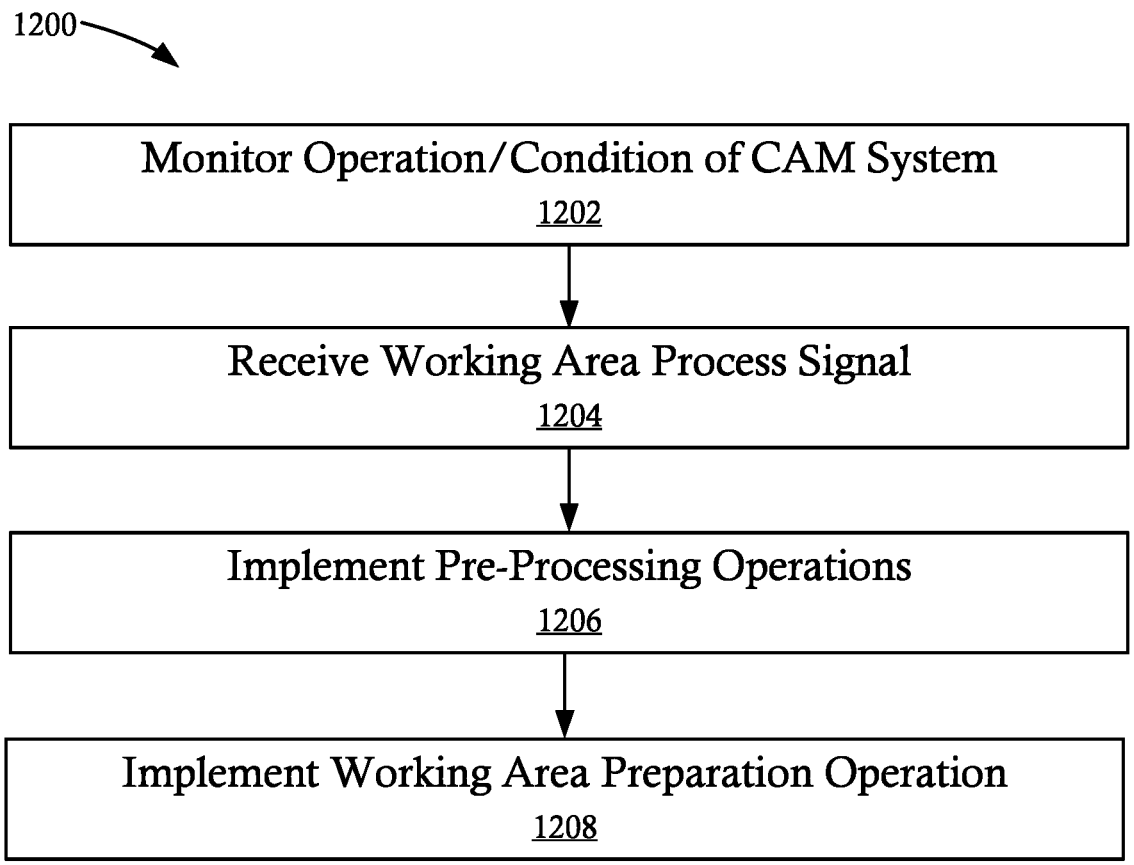
FIG. 9 is a flowchart illustrating a workspace maintenance method 1200, in accordance with some embodiments.

FIG. 9 is a flowchart illustrating a workspace maintenance method 1200, in accordance with some embodiments. The workspace maintenance method 1200 may be integrated with and/or performed in conjunction with one or more steps and/or sub-methods of the method 200 discussed above. For example, in some embodiments, the workspace maintenance method 1200 may be integrated with and/or performed in conjunction with the integrated scanning method 400 discussed above.

At step 1202, an operation and/or condition of a CAM manufacturing system is monitored to determine when undesirable elements are present. In some embodiments, operations within a predetermined working area of a CAM manufacturing system, such as the working area 308 of the CAM manufacturing system 302 discussed above, may generate undesirable elements within the working area 308, such as debris, waste materials, non-target material chunks, by-products, castoff, etc., The presence of undesirable elements may interfere with current and/or subsequent manufacturing processes and/or operations. Additionally and/or alternatively, the presence of undesirable elements may create unsafe or hazardous working conditions, such as when a flammable gas or material is present during a high-temperature operation.

In some embodiments, input from one or more integrated monitoring elements, such as an integrated scanner 304 and/or one or more sensors 340, may be utilized to determine when undesirable elements and/or when a threshold amount of undesirable elements are present. For example, one or more sensors 340 may be configured to detect the presence of undesirable elements. As another example, the one or more sensors 340 may be configured to detect environmental elements, such as one or more specific gases, liquids, etc. within the working area 308.

In some embodiments, output from the integrated scanner 304 is utilized to detect the presence of one or more undesirable elements. For example, as discussed above, the integrated scanner 304 may utilized in an integrated scanning method 400 to monitor operation of a CAM manufacturing system 302 and/or a state of a workpiece. Output from the integrated scanner 304, obtained during an integrated scanning method 400 and/or independent of an integrated scanning method 400, may be processed to identify the presence of undesirable materials within the working area 308, such as portions of the working area 308 not occupied by the work piece. The output from the integrated scanner 304, e.g., visual data output, spectral data output, contact data output, etc. may be analyzed and/or processed by one or more software processes, such as a monitoring process implemented by the computing device 306. The output from the integrated scanner 304 may be processed using any suitable processing mechanism, such as, for example, one or more trained image recognition models, one or more spectral analysis modules, one or more change-based monitoring models, one or more motion detection models, etc.

It will be appreciated that the type of monitoring provided by the processing mechanisms may be related to a type of output generated by the integrated scanner 304. For example, in embodiments including an integrated scanner 304 capable of obtaining continuous input in the visual spectrum, the processing mechanisms may utilize video processing techniques, such as object recognition, trajectory determination, frame change analysis, etc. As another example, in embodiments including an integrated scanner 304 capable of obtaining electromagnetic spectrum input (e.g., visible and/or non-visible light), the processing mechanisms may utilize spectrographic processing techniques to determine the presence and/or absence of certain elements in the electromagnetic spectrum data.

In some embodiments, the output from multiple monitoring elements may be utilized to detect the presence of undesirable materials. For example, in some embodiments, one or more sensors 340 may be configured to detect a first set or class of undesirable elements (such as undesirable gases) and the integrated scanner 304 may be configured to detect a second set or class of undesirable elements (e.g., debris, castoff, and/or other undesirable materials). It will be appreciated that any number of monitoring elements may be configured to detect any combination of undesirable elements prior to, during, and/or after one or more operations of the CAM manufacturing system 302.

As another example, in some embodiments, a first monitoring element, e.g., a first sensor and/or the integrated scanner 304, may be configured to perform a first monitoring process to detect the presence of a potential undesirable and/or hazardous material. When a potentially undesirable/hazardous material is detected, a second monitoring element, e.g., a second sensor and/or the integrated scanner 304, may be activated and/or operated to confirm the presence of the potentially undesirable and/or hazardous material. For example, in some embodiments, a first monitoring element, such as a sensor, may detect the presence of a potentially undesirable material in a first portion of the working area 308. In response to the detection by the first sensor, the integrated scanner 304 may be operated and/or configured to obtain scan data including the first portion of the working area 308. The scan data may be processed to verify the presence of an undesirable material in the first portion of the working area 308. Although specific embodiments are discussed herein, it will be appreciated that any number of parallel and/or serial monitoring processes may be implemented to detect and/or verify the presence of undesirable materials.

In some embodiments, the CAM manufacturing system 302 may include operation-specific monitoring elements configured to monitor one or more predetermined operations. For example, in some embodiments, a first monitoring element may be configured to detect undesirable environmental elements generated during a first CAM manufacturing operation, such as a subtractive manufacturing operation. The first monitoring element may be activated when the CAM manufacturing system 302 is configured and/or operated to perform the corresponding subtractive manufacturing operation. In some embodiments, the first monitoring element may be configured to detect an environmental element that, while undesirable during a first operation (e.g., a first subtractive operation) is not harmful and/or is desired during a second operation (e.g., a second subtractive operation, an additive operation, etc.). In order to avoid a false detection of an undesirable element, the first monitoring element may be operated only during the corresponding first subtractive manufacturing operation.

In some embodiments, the CAM manufacturing system 302 includes a plurality of operation-specific monitoring elements each configured to detect an undesirable element during a selected set of manufacturing operations. For example, in some embodiments, a first set of monitoring elements may be operated and/or activated during a first set of operations, such as a first set of subtractive operations, and a second set of monitoring elements may be operated and/or activated during a second set of operations, such as a second set of subtractive operations and/or a set of additive operations. In some embodiments, when an operation outside of the set of operations is performed (e.g., an unmonitored operation is performed), one or more monitoring elements may be deactivated, removed from the CAM manufacturing system 302, and/or protected from the environment of the working area 308. For example, in some embodiments, a first set of monitoring elements may include a monitoring element that is negatively impacted by an environmental element that is a necessary and/or unavoidable component of a CAM operation (e.g., being sensitive to exposure to a specific gas necessary for an operation, being sensitive to liquid when a liquid-based operation is being performed, etc.). In some embodiments, a protective element, such as an auto-hatch or positive pressure enclosure as discussed above, may be utilized to protect one or more monitoring elements during operations that may negatively impact the monitoring element. Although specific embodiments are discussed herein, it will be appreciated that any suitable number of monitoring elements may be utilized for monitoring any set(s) of operations.

In some embodiments, a monitoring process may be configured to differentiate between an allowable material (e.g., desirable material such as a work piece, expected material such as a tool, tolerable or non-problem material such as non-harmful gases or low-volume waste, etc.) and non-allowable or undesirable materials (e.g., harmful gases, unexpected materials, debris, high-volume waste, etc.). For example, in some embodiments, output from the integrated scanner 304 and data regarding expected operations of the CAM manufacturing system 302, such as tool path information, work piece evaluation data, etc., may be used to differentiate between materials or elements that are expected within the working area 308 (e.g., work piece, working arm 310, tool 314, etc.) and undesirable elements. For example, if the integrated scanner 304 generates scan data indicating the presence of a material that is not included in one of the CAD drawings and/or the expected CAM tool paths generated during implementation of the method 200 discussed above, the computing device 306 may determine that the material is undesirable.

At step 1204, a working area process signal indicating that one or more operations and/or processes for cleaning, sanitizing, evacuating, decontaminating, etc. of the working area (or a portion thereof) is received. For example, in some embodiments, when an undesirable element is detected at step 1102, a working area process signal may be generated indicating that one or more operations are required to clear the undesirable element from the working area 308. As another example, in some embodiments, a working area process signal may be generated by a device or system, such as the CAM manufacturing system 302 and/or the computing device 306, in response to one or more additional inputs, such as a working area process signal generated in response to a control signal received by the CAM manufacturing system 302 to perform an operation requiring pretreatment and/or preparation of the working area 308.

At optional step 1206, one or more pre-processing operations are performed. The one or more pre-processing operations are configured to prepare the CAM system 300, or components thereof, for one or more operations to be performed in response to the detection of the undesirable element. For example, in some embodiments, one or more enclosures and/or sealing elements integrated with a CAM manufacturing system 302 may be operated to protect one or more components, such as an integrated scanner 304, one or more sensors, etc., from a subsequent operation. As another example, in some embodiments, a current manufacturing operation may be paused to allow for removal of the undesirable element. The pre-processing operations may be selected based on the operation(s) to be performed. For example, in some embodiments, a working area 308 may be sealed to allow for operation of a vacuum or pressure maintenance process.

In some embodiments, the pre-processing operations are performed automatically in response to detection of the undesirable element. For example, in some embodiments, the computing device 306 may be configured to automatically cause the one or pre-processing operations to be performed, such as by causing one or more enclosures, seals, etc. to be positioned in a closed/scaled state. The computing device 306 may provide operational signals directly to the protective elements and/or may provide control signals to one or more components of the CAM system 300, such as the CAM manufacturing system 302 or the integrated scanner 304, to cause the one or more components to operate the protective elements. In some embodiments, the computing device 306 is configured to activate one or more pre-processing activities simultaneously (e.g., in parallel) and/or sequentially (e.g., serially).

At step 1208, a working area preparation operation is performed. For example, in some embodiments, a working area preparation operation may be configured to remove an undesirable element from the working area 308. As another example, in some embodiments, a working area preparation operation may be configured to prepare a working area 308 for one or more subsequent operations, such as by sanitizing and/or decontaminating the working area 308 prior to a manufacturing operation that is sensitive to environmental contaminants. The working area preparation operation may include any suitable operation, such as a negative pressure (e.g., vacuum) operation, a positive pressure (e.g., blower) operation, a mechanical operation, a gravity-based operation, etc. The working area preparation operation may include activation of one or more elements or features to assist in preparation of the working area 308, such as opening or positioning of one or more ingress and/or egress paths or channels (e.g., opening inflow valves, opening outflow valves, opening doors covering gravity-fed debris channels, etc.), activation of one or more pressure systems (e.g., vacuum system, blower system, etc.), actuation of one or more mechanical elements (e.g., scraping arm, brush, claw, magnet, etc.), and/or actuation of any other suitable maintenance element.

In some embodiments, the working area preparation operation includes a decontamination process configured to prepare the working area 308 (or a portion thereof) for a subsequent manufacturing operation. For example, in some embodiments, material adhesion may be impacted by the presence of contaminants in the working area 308. Prior to performing an adhesion-based operation, a working area preparation operation may be performed to decontaminate, sterilize, and/or otherwise remove potential contaminants from the working area 308. A decontamination process may include one or more of a mechanical process (e.g., a mechanical material removal process), a negative pressure process (e.g., evacuation of atmosphere within the working are 308), a positive pressure process (e.g., inflow of gas into the working area 308), and/or any other suitable process.

Figure 10:
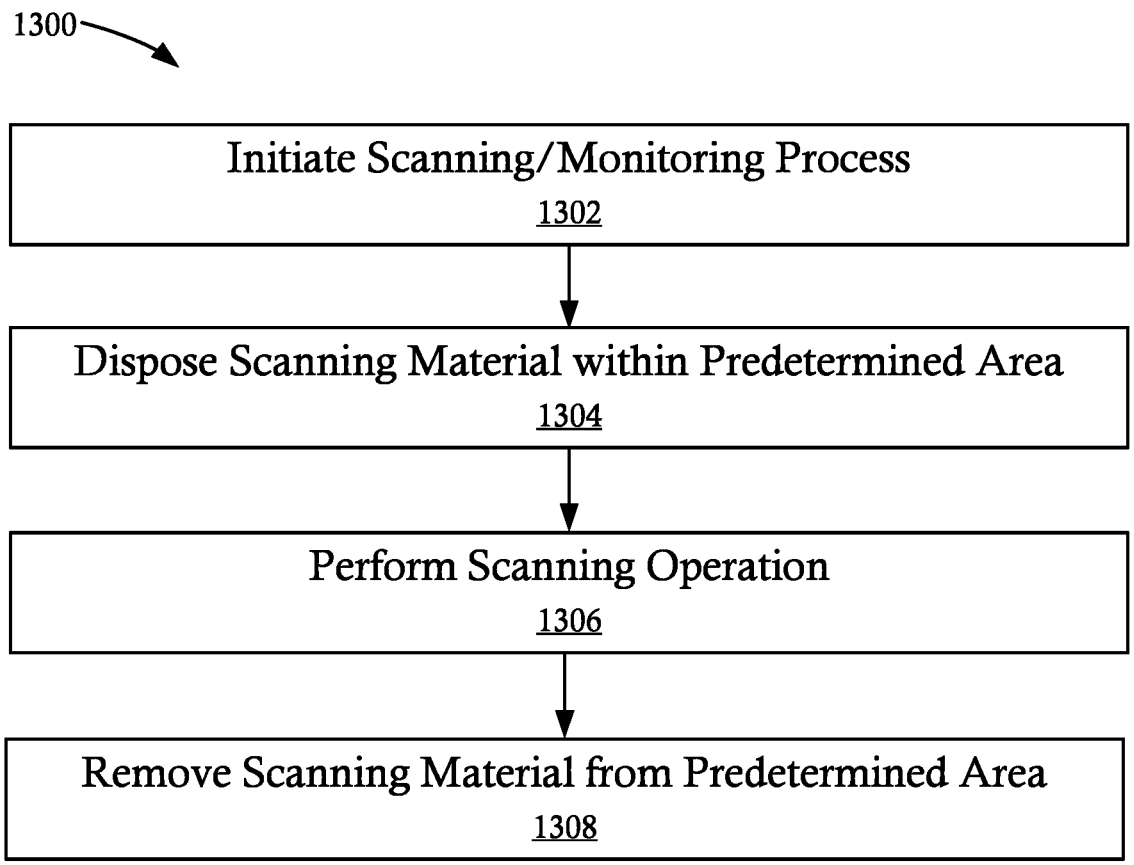
FIG. 10 is a flowchart illustrating a material-assisted scanning process 1300, in accordance with some embodiments.

FIG. 10 is a flowchart illustrating a material-assisted scanning process 1300, in accordance with some embodiments. At step 1302, a scanning process is initiated. The scanning process may include an integrated scanning method 400 as discussed above (such as a work piece material scanning process, a working area 308 scanning process, etc.) In some embodiments, the scanning process is initiated by one or more triggers. For example, a scanning process may be initiated as discussed above with respect to the method 200. As another example, a scanning process may be initiated as discussed above with respect to the workspace maintenance method 1200. As yet another example, in some embodiments, a scanning process may be initiated in response to completion of one or more automated operations, such as one or more CAM manufacturing operations.

At step 1304, a scanning assistive material is disposed within a predetermined area. The predetermined area may include at least a portion of a working area, such as working area 308 and/or may include one or more elements located within the predetermined area, such as a workpiece located within a portion of a working area 308. The scanning assistive material may be deposited within the predetermined area using any suitable deposition mechanism, such as, for example, a positive pressure (e.g., forced air, aerosol, etc.) mechanism, a powder coating mechanism, a liquid-based deposition mechanism, etc.

The scanning assistive material may include any suitable material configured to assist in a simultaneous and/or subsequent scanning process. For example, in various embodiments, the scanning assistive material may include, but is not limited to, a foam material, a liquid material, a gaseous material, a nano-particle material, etc. The scanning assistive material may be configured to be retained on one or more surfaces located within the predetermined area, such as one or more surfaces of a workpiece, tool 314, etc. located within the predetermined area (e.g., a powder, aerosol, or liquid configured to be at least partially retained by a surface when the surface comes into contact with the material) and/or may be configured to flow around (e.g., avoid retention by) the one or more surfaces (e.g., a colored gas configured to flow around a surface without being retained).

In some embodiments, the scanning assistive material is configured to interact with (e.g., enable, enhance, etc.) a scanning process implemented by one or more scanners, such as an integrated scanner 304. For example, the scanning assistive material may be configured to generate, react to, or be visible in a predetermined electromagnetic spectrum (e.g., visible, infrared, ultraviolet, etc.) that is captured by the integrated scanner 304. As one non-limiting example, in some embodiments, a gas or fluid scanning assistive material may be provided in a working area 308 including a workpiece to provide a visual reference to an integrated scanner 304 based on the interactions (e.g., trajectory changes) of the scanning assistive material after interaction with the workpiece. As another non-limiting example, in some embodiments, a powder or aerosol material may be deposited on a workpiece located within a working area 308 to provide enhanced resolution, contrast, etc. to portions of workpiece scanned by an integrated scanner 304. It will be appreciated that any suitable scanning assistive material may be coupled with any suitable sensor of an integrated scanner 304 to enable and/or enhance generation of scan data within the predetermined area.

In some embodiments, a scanning assistive material may include a reflective and/or absorbing material. For example, in some embodiments, a scanning assistive material may include a material configured to absorb or dampen energy in a predetermined electromagnetic spectrum (e.g., visible light, ultraviolet, infrared, etc.). The scanning assistive material may reduce reflections, glare, and/or other distortions caused by reflection of electromagnetic energy, increasing accuracy, fidelity, resolution, etc. As another example, in some embodiments, a scanning assistive material may include a material configured to reflect or enhance energy in a predetermined electromagnetic spectrum. The scanning assistive material may increase reflection of the electromagnetic energy for one or more surfaces to increase contrast, resolution, etc. of the one or more surfaces.

In some embodiments, a scanning assistive material may be applied in conjunction with and/or may operate as one or more additional materials. For example, in some embodiments, a scanning assistive material may be incorporated into and/or include a coolant material configured to be applied to a workpiece during and/or subsequent to a manufacturing operation. In some embodiments, the additional material includes one or more properties that function as a scanning assistive material, for example, having a matte (e.g., absorptive) finish or color. Although specific embodiments are discussed herein, it will be appreciated that the scanning assistive material may be configured to provide one or more additional functions (e.g., lubrication, cooling, etc.), may be integrated into one or more additional materials configured to provide one or more additional functions, and/or may be deposited in conjunction with one or more additional materials.

In some embodiments, the scanning assistive material includes electromagnetic energy. For example, in some embodiments, a predetermined wavelength of electromagnetic energy (e.g., a predetermined wavelength of visible light, ultraviolet, infrared, etc.) may be applied within a predetermined area prior to and/or in conjunction with a scanning operation. The electromagnetic energy may be configured to interact with one or more materials of a working piece (e.g., causing one or more materials to have a specific color, emit electromagnetic energy (e.g., glow), etc.) and/or may be configured to illuminate or highlight elements within the predetermined area, such as illuminating and/or highlighting at least a portion of a workpiece positioned within a working area 308. Although specific embodiments are discussed herein, it will be appreciated that any suitable combination of electromagnetic energy may be applied within a predetermined area to facilitate and/or enhance a scanning operation performed by a scanner, such as an integrated scanner 304.

At step 1306, a scanning operation is performed to obtain scan data within the predetermined area. As discussed above, a scanning operation is configured to obtain scan data representative of one or more elements, such as a workpiece, located within a predetermined area, such as a working area 308. The scanning operation is configured to interact with the scanning assistive material. For example, in some embodiments, the scanning assistive material is configured to enable a scanning operation by an integrated scanner 304 (e.g., illuminating a workpiece with electromagnetic energy of one or more predetermined wavelengths, providing a visual que for obtaining scan data and/or determining structures within the scan data, etc.). As another example, in some embodiments, the scanning assistive material is configured to enhance a scanning operation by an integrated scanner 304 (e.g., dampening or absorbing electromagnetic energy).

At optional step 1208, a material removal process is initiated to remove the scanning assistive material from the predetermined area. For example, as discussed above, a working area preparation operation may be performed to remove undesirable material from a working area 308. After a scanning operation is complete, the remaining scanning assistive material may be considered an undesirable material and removed through one or more working area preparation operations, as discussed above. As another example, in some embodiments, a workpiece preparation process may be applied to remove deposited scanning assistive material from a workpiece. The workpiece preparation process may include a direct process (e.g., application of a brush or other tool directly to the workpiece) and/or an indirect process (e.g., a positive or negative pressure process, a liquid application process).

In some embodiments, the material removal process includes re-capture of the scanning assistive material. The scanning assistive material may include a reusable material, such as a gas, liquid, etc. that may be re-applied for a subsequent scanning process. The material remove process may collect the scanning assistive material, for example, through a negative pressure evacuation, drain, etc., and store the scanning assistive material for re-application. The scanning assistive material may be stored in a reservoir coupled to mechanism for applying the a scanning assistive material and recovering the scanning assistive material. In some embodiments, the scanning assistive material includes a disposable material and the material removal process includes elimination of the scanning assistive material.

Although steps 1304, 1306, and 1308 are shown as separate steps, it will be appreciated that application of a scanning assistive material, a scanning operation, and/or removal of a scanning assistive material may be performed in any suitable combination. For example, in embodiments including a scanning assistive material configured to provide a transient enhancement to a workpiece (e.g., illumination of the workpiece, movement of material around the workpiece, etc.), scan data must be obtained simultaneous with application of the scanning assistive material to provide the transient enhancement. As another example, in embodiments including a gaseous scanning assistive material, the application and removal processes may be applied simultaneously and/or may be integrated into a single process (e.g., a single process including positive pressure ingress of a scanning assistive material and negative pressure evacuation of the scanning assistive material to provide a predetermined flow path for the scanning assistive material). Although specific embodiments are discussed herein, it will be appreciated that steps 1204-1208 may be applied in any suitable combination.

Figure 11:
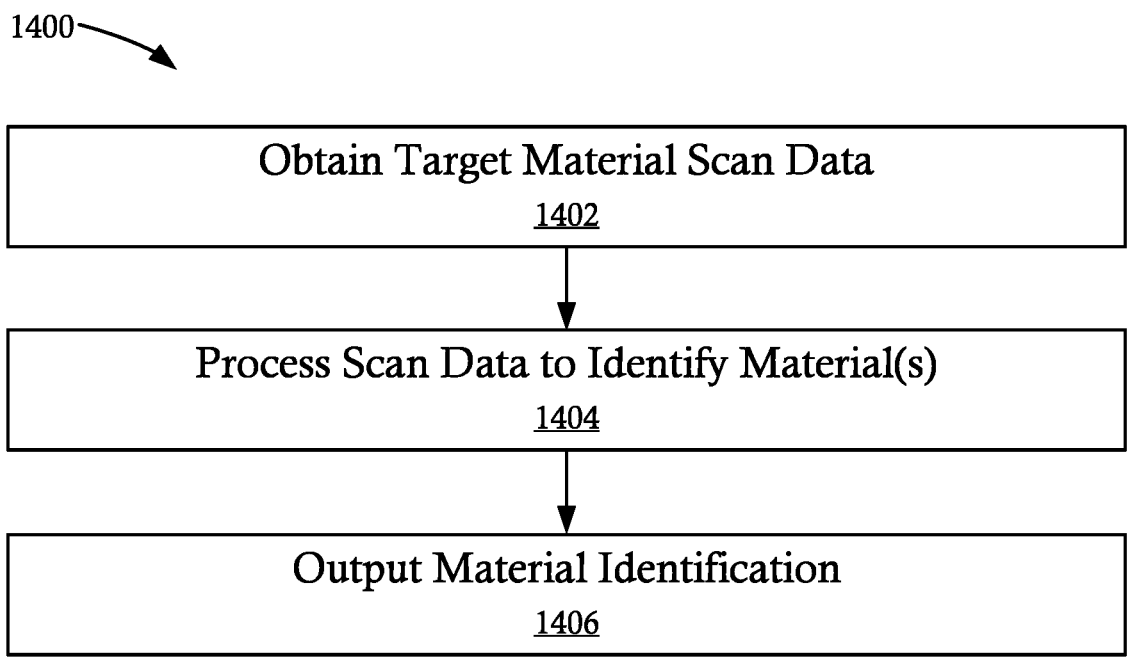
FIG. 11 is a flowchart illustrating a material identification method 1400, in accordance with some embodiments.

FIG. 11 is a flowchart illustrating a material identification method 1400, in accordance with some embodiments. The material identification method 1400 is configured to determine a material of an element, such as a workpiece, positioned within a working area 308. At step 1402, scan data is obtained for a target material. The target material may include bulk material, a partially finished workpiece, a previously generated workpiece, and/or any other suitable material. The scan data may be obtained according to any suitable scanning process, such as, for example, one or more of the scanning processes (e.g. integrated scanning method 400) discussed herein. In some embodiments, a scanner, such as the integrated scanner 304, is configured to obtain scan data selected for and/or suitable for subsequent material identification steps, as discussed below.

In some embodiments, the scan data may be obtained according to one or more processes configured to generate material-specific data. For example, in some embodiments, a scan data may be obtained for one or more predetermined electromagnetic wavelengths. As another example, in some embodiments, scan data may be obtained in conjunction with one or more scan enhancement elements, such as an applied scanning assistive material, applied electromagnetic energy (e.g., voltage, current, inductive energy, etc.).

At step 1404, the scan data is processed to identify one or more materials included therein. For example, in some embodiments, a device, such as a computing device 306, is configured to implement one or more trained material recognition models. A trained material recognition model may include a machine learning model configured to identify one or more materials within input image data. A trained material recognition model may be configured to utilize one or more visual properties identifiable in image data to identify a material. As another example, in some embodiments, the scan data may include spectrum data, such as data obtained for various electromagnetic wavelengths. The spectrum data may be analyzed to determine a material (e.g., a composition) of one or more materials in the image. It will be appreciated that any suitable material identification process may be implemented to identify materials in scan data.

At step 1406, a material identification is output for use in further processing. For example, in some embodiments, the material identification may be provided to a computing device 306 for use in an integrated CAD/CAM manufacturing process, such as the method 200 discussed above. The material identification may be provided in conjunction with other scan data derived data, such as, for example, material dimensions, material position, electromagnetic properties, etc.

Figure 12:
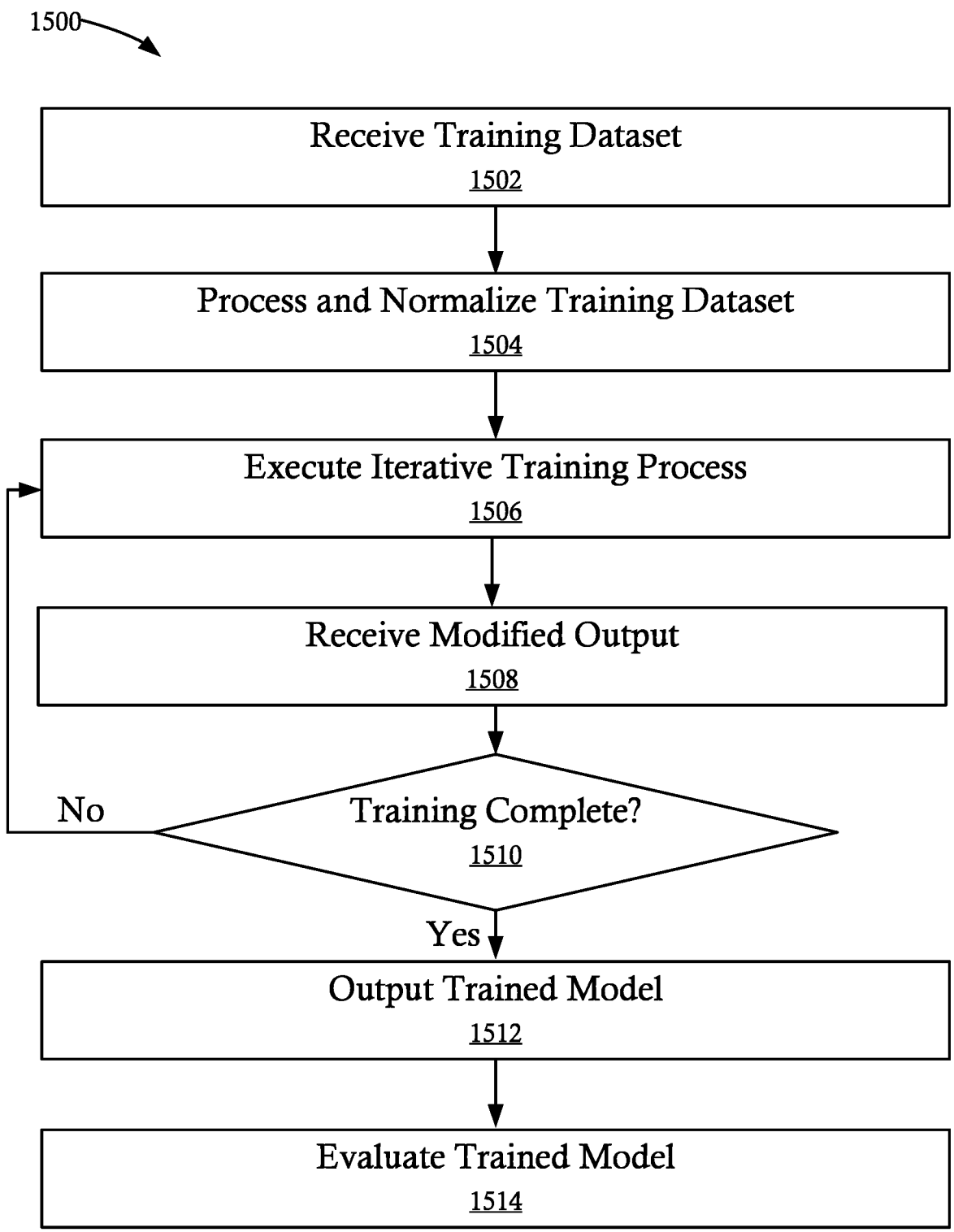
FIG. 12 is a flowchart illustrating a training method for generating a trained machine learning model, in accordance with some embodiments.
Figure 13:
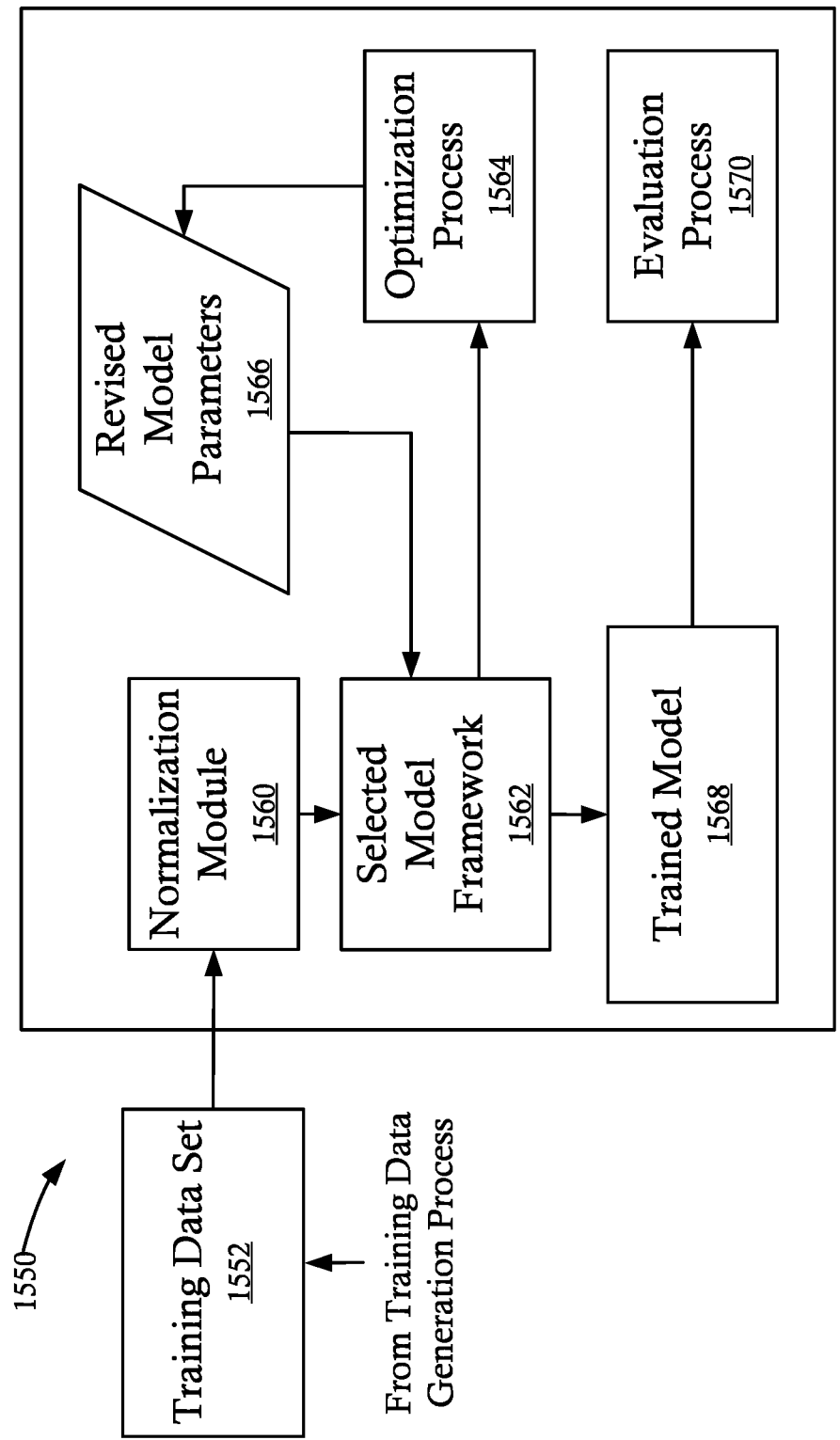
FIG. 13 is a process flow illustrating various steps of the training method of FIG. 12, in accordance with some embodiments.

In some embodiments, one or more of the disclosed methods may be implemented by and/or include one or more trained models. In some embodiments, one or more trained models can be generated using an iterative training process based on a training dataset. FIG. 12 illustrates a method 1500 for generating a trained model, such as a trained optimization model, in accordance with some embodiments. FIG. 13 is a process flow 1550 illustrating various steps of the method 1500 of generating a trained model, in accordance with some embodiments. At step 1502, a training dataset 1552 is received by a system, such as a computing device 306. The training dataset 1552 can include labeled and/or unlabeled data. For example, in some embodiments, a set of labeled data, a set of semi-labeled data, and/or a set of unlabeled data is provided for use in training a model.

At optional step 1504, the received training dataset 1552 is processed and/or normalized by a normalization module 1560. For example, in some embodiments, the training dataset 1552 can be augmented by imputing or estimating missing values of one or more features associated with a training dataset. In some embodiments, processing of the received training dataset 1552 includes outlier detection configured to remove data likely to skew training of a model. In some embodiments, processing of the received training dataset 1552 includes removing features that have limited value with respect to training of a selected model.

At step 1506, an iterative training process is executed to train a selected model framework 1562. The selected model framework 1562 can include an untrained (e.g., base) machine learning model and/or a partially or previously trained model (e.g., a prior version of a trained model). The training process is configured to iteratively adjust parameters (e.g., hyperparameters) of the selected model framework 1562 to minimize a cost value (e.g., an output of a cost function) for the selected model framework 1562. In some embodiments, the cost value is related to a delta (e.g., difference) between an expected or predicted value (e.g., a CAD model, a CAM tool path) and one or more actual or generated values (e.g., scan data indicating parameters of a workpiece, data indicating an implemented CAM tool path, etc.).

The training process is an iterative process that generates set of revised model parameters 1566 during each iteration. The set of revised model parameters 1566 can be generated by applying an optimization process 1564 to the cost function of the selected model framework 1562. The optimization process 1564 can be configured to reduce the cost value (e.g., reduce the output of the cost function) at each step by adjusting one or more parameters during each iteration of the training process.

After each iteration of the training process, at step 1508, a determination is made whether the training process is complete. The determination at step 1508 can be based on any suitable parameters. For example, in some embodiments, a training process can complete after a predetermined number of iterations. As another example, in some embodiments, a training process can complete when it is determined that the cost function of the selected model framework 1562 has reached a minimum, such as a local minimum and/or a global minimum.

At step 1510, a trained model 1568 is output and provided for use, for example, as part of one or more of the methods discussed herein. At optional step 1512, a trained model 1568 can be evaluated by an evaluation process 1570. A trained model can be evaluated based on any suitable metrics, such as, for example, an F or F1 score, normalized discounted cumulative gain (NDCG) of the model, mean reciprocal rank (MRR), mean average precision (MAP) score of the model, and/or any other suitable evaluation metrics. Although specific embodiments are discussed herein, it will be appreciated that any suitable set of evaluation metrics can be used to evaluate a trained model.

Although the subject matter has been described in terms of exemplary embodiments, it is not limited thereto. Rather, the appended claims should be construed broadly, to include other variants and embodiments, which can be made by those skilled in the art.

What is claimed is:

1. A system comprising:
    a computer aided manufacturing device comprising at least one tool operable to perform at least a first manufacturing operation within a working area;
    a scanner configured to obtain scan data corresponding to at least a portion of the working area; and
    a processor configured to:
        configure scan-specific controls including a least one scan-specific parameter for scanning a workpiece positioned within the working area;
        the at least one scan-specific parameter comprising at least one of a lighting parameter, a material reflectivity parameter, an object location and orientation parameter, and an object reflectivity parameter;
        operate the scanner to obtain scan data including the workpiece positioned within the working area;
        generate a digital model of the workpiece based on the scan data of the workpiece;
        configure setup parameters for the computer aided manufacturing device including at least one tool specific parameter for the at least one tool;
        generate a first tool path for the at least one tool to perform the first manufacturing operation within the working area based on the digital model and the setup parameters;
        operate the computer aided manufacturing system to perform a portion of the first manufacturing operation according to the first tool path to generate a first modified workpiece;
        operate the scanner to obtain scan data of the first modified workpiece;
        generate a second tool path to perform a second manufacturing operation within the work area, wherein the second tool path is generated based at least in part on the scan data of the first modified workpiece, and wherein the second manufacturing operation is distinct from the first manufacturing operation;
        operate the computer aided manufacturing system according to the second tool path to perform the second manufacturing operation;
        operate the computer aided manufacturing system to complete the first manufacturing operation according to the first tool path to generate a second modified workpiece;
        operate the scanner to obtain scan data of the second modified workpiece; and
        verify the first manufacturing operation based on the scan data of the second modified workpiece.

2. The system of claim 1, wherein the first manufacturing operation comprises one of an additive manufacturing operation, a subtractive manufacturing operation, or a hybrid manufacturing operation.

3. The system of claim 1, wherein the scanner is integrated with the computer aided manufacturing device at a fixed location, and wherein the scanner includes a field of view comprising at least the portion of the working area.

4. The system of claim 1, wherein the computer aided manufacturing device comprises a moveable arm, and wherein the at least one tool is configured to be coupled to a working portion of the moveable arm.

5. The system of claim 4, wherein the scanner is configured to be coupled to the moveable arm of the computer aided manufacturing device.

6. The system of claim 1, wherein the scanner is configured to obtain scan data of the at least one tool.

7. The system of claim 6, wherein the setup parameters for the computer aided manufacturing device are based on the scan data of the at least one tool.

8. The system of claim 1, wherein the first manufacturing operation comprises at least two of an additive manufacturing process, a subtractive manufacturing process, or a hybrid manufacturing process.

9. The system of claim 1, wherein the computer aided manufacturing device includes a tool storage area, and wherein the scanner is positionable, at least partially, within the tool storage area.

10. The system of claim 1, wherein the at least one tool comprises a first tool and a second tool, and wherein the first tool path comprises a first tool sub-path corresponding to the first tool and a second tool sub-path corresponding to the second tool.

11. The system of claim 1, wherein the processor is configured to generate a digital tool model of the at least one tool, and wherein the first tool path is generated based on the digital model, the setup parameters, and the digital tool model.

12. A method of operating a computer aided manufacturing device, comprising:

configuring scan-specific controls including at least one scan specific parameter for scanning a workpiece positioned within a working area;

the at least one scan-specific parameter comprising at least one of a lighting parameter, a material reflectivity parameter, an object location and orientation parameter, and an object reflectivity parameter;

obtaining, by a scanner integrated with the computer aided manufacturing device, scan data including the workpiece positioned within the working area of the computer aided manufacturing device;

generating, by a processor, a digital model of the workpiece from the scan data;

configuring, by the processor, setup parameters for the computer aided manufacturing device including at least one tool specific parameter for at least one tool of the computer aided manufacturing device;

generating, by the processor, a first tool path for the at least one tool of the computer aided manufacturing device, wherein the first tool path is generated based, at least in part, on the digital model and the setup parameters;

operating, by the processor, the computer aided manufacturing system to perform a portion of a first manufacturing operation according to at least a first portion of the first tool path to generate a first modified workpiece;

obtaining, by the scanner, scan data of the first modified workpiece;

generating, by the processor, a second tool path to perform a second manufacturing operation within the working area, wherein the second manufacturing operation is applied to the first modified workpiece, and wherein the second manufacturing operation is distinct from the first manufacturing operation;

operating, by the processor, the computer aided manufacturing system to perform the second manufacturing operation according to the second tool path;

operating, by the processor, the computer aided manufacturing system to complete the first manufacturing operation according to at least a second portion of the first tool path to generate a second modified workpiece;

generating, by the scanner, scan data of the second modified workpiece; and verifying, by the processor, the first manufacturing operation based on the scan data of the second modified workpiece.

13. The method of claim 12, wherein the first manufacturing operation comprises one of an additive manufacturing operation, a subtractive manufacturing operation, or a hybrid manufacturing operation.

14. The method of claim 12, wherein the scanner is integrated with the computer aided manufacturing device at a fixed location, and wherein the scanner includes a field of view comprising at least a portion of the working area.

15. The method of claim 12, wherein operating the computer aided manufacturing device comprises:

coupling the at least one tool to a moveable arm; and operating the moveable arm to cause the at least one tool to move according to the first tool path to perform the first manufacturing operation.

16. The method of claim 12, comprising generating, by the scanner, scan data of the at least one tool.

17. The method of claim 12, wherein the first manufacturing operation comprises at least two of an additive manufacturing process, a subtractive manufacturing process, or a hybrid manufacturing process.

18. The method of claim 12, wherein the at least one tool comprises a first tool and a second tool, and wherein the first tool path comprises a first tool sub-path corresponding to the first tool and a second tool sub-path corresponding to the second tool.

19. A system, comprising:

a computer aided manufacturing device comprising:

at least one tool operable to perform at least a first manufacturing operation within a working area defined by the computer aided manufacturing device;

an integrated scanner comprising a field of view including at least a portion of the working area; and a processor configured to:

configure scan-specific controls including at least one scan specific parameter for scanning a workpiece positioned within the working area;

the at least one scan-specific parameter comprising at least one of a lighting parameter, a material reflectivity parameter, an object location and orientation parameter, and an object reflectivity;

obtain scan data including the workpiece positioned within the working area, wherein the scan data is obtained from the integrated scanner;

generate a digital model of the workpiece based on the scan data of the workpiece;

configure setup parameters for the computer aided manufacturing device including at least one tool specific parameter for the at least one tool;

generate a first tool path configured to operate the computer aided manufacturing device to perform the first manufacturing operation within the working area based on the digital model and the setup parameters;

transmit instructions to the computer aided manufacturing system configured to cause the computer aided manufacturing system to perform at least a portion of the first manufacturing operation according to the first tool path to generate a first modified workpiece;

obtain scan data of the first modified workpiece from the integrated scanner;

generate a second tool path to perform a second manufacturing operation within the working area, wherein the second manufacturing operation is applied to the first modified workpiece, and wherein the second tool path is generated at least in part on the scan data of the first modified workpiece, and wherein the second manufacturing operation is distinct from the first manufacturing operation;

transmit instructions to the computer aided manufacturing system to cause the computer aided manufacturing system to perform the second manufacturing operation according to the second tool path;

transmit instructions to the computer aided manufacturing system to cause the computer aided manufacturing system to complete the first manufacturing operation according to the first tool path to generate a second modified workpiece;

obtain scan data of the second modified workpiece from the integrated scanner; and verify the first manufacturing operation based on the scan data of the second modified workpiece.

20. The system of claim 19, wherein the computer aided manufacturing device comprises a moveable arm configured to be selectively coupled to the at least one tool and the integrated scanner.

* * * * *